US009417757B1

(12) United States Patent
Caiani et al.

(10) Patent No.: US 9,417,757 B1
(45) Date of Patent: Aug. 16, 2016

(54) SCALABLE HIERARCHICAL USER INTERFACE DISPLAY

(71) Applicant: EMC Corporation, Hopkinton, MA (US)

(72) Inventors: Joseph C. Caiani, Boston, MA (US); Rhon Porter, South Grafton, MA (US); Bruce R. Rabe, Dedham, MA (US); Kendra M. Marchant, Arlington, MA (US); Scott E. Joyce, Foxboro, MA (US)

(73) Assignee: EMC Corporation, Hopkinton, MA (US)

( * ) Notice: Subject to any disclaimer, the term of this patent is extended or adjusted under 35 U.S.C. 154(b) by 347 days.

(21) Appl. No.: 14/032,547

(22) Filed: Sep. 20, 2013

(51) Int. Cl.
*G06F 3/048* (2013.01)
*G06F 9/455* (2006.01)

(52) U.S. Cl.
CPC ............ *G06F 3/048* (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 5,615,346 A * | 3/1997 | Gerken | G06F 3/0481 | 715/786 |
| 7,266,785 B2 * | 9/2007 | Grotjohn | G06F 17/30126 | 707/E17.01 |
| 7,475,365 B2 * | 1/2009 | Nan | G06F 9/4443 | 707/999.01 |
| 2002/0184441 A1 * | 12/2002 | Wong | G06F 12/123 | 711/113 |
| 2006/0010399 A1 * | 1/2006 | Lau | G06F 3/0482 | 715/853 |
| 2006/0294330 A1 * | 12/2006 | Stanfill | G06F 12/123 | 711/159 |
| 2007/0198476 A1 * | 8/2007 | Farago | G06F 3/0485 | |
| 2008/0201315 A1 * | 8/2008 | Lazier | G06F 3/04812 | |
| 2011/0055203 A1 * | 3/2011 | Gutt | G06F 17/30533 | 707/722 |
| 2011/0099511 A1 * | 4/2011 | Waldeck | G06F 3/0482 | 715/786 |
| 2011/0136545 A1 * | 6/2011 | Dai | G09G 3/3406 | 455/566 |
| 2011/0154385 A1 * | 6/2011 | Price | H04H 60/45 | 725/12 |
| 2011/0202871 A1 * | 8/2011 | Bair | G06F 3/04855 | 715/786 |
| 2012/0011430 A1 * | 1/2012 | Parker | G06F 3/0485 | 715/234 |
| 2012/0036428 A1 * | 2/2012 | Tsuda | G06F 3/048 | 715/252 |
| 2012/0117226 A1 * | 5/2012 | Tanaka | H04L 41/0266 | 709/224 |
| 2012/0144333 A1 * | 6/2012 | Shatalin | G06F 9/4443 | 715/771 |
| 2013/0044231 A1 * | 2/2013 | Chuang | H04R 3/00 | 382/211.4 |
| 2013/0055092 A1 * | 2/2013 | Cannon, III | G06F 3/0484 | 715/738 |
| 2013/0086131 A1 * | 4/2013 | Hunt | G06F 12/0276 | 707/819 |
| 2013/0086132 A1 * | 4/2013 | Hunt | G06F 12/0276 | 707/819 |
| 2013/0159922 A1 * | 6/2013 | Borkowski | G06F 3/04855 | 715/786 |
| 2015/0007108 A1 * | 1/2015 | Ozcelik | G06F 3/0485 | 715/810 |

\* cited by examiner

*Primary Examiner* — Hien Duong
(74) *Attorney, Agent, or Firm* — Muirhead and Saturnelli, LLC

(57) ABSTRACT

Described are techniques for displaying data. A first set of data is received that includes a first plurality of objects at a first level in a hierarchy. At least some of the first plurality of objects are displayed on a user interface display. A first object is selected from the at least some of the first plurality of objects displayed on the user interface display. Responsive to selecting the first object, a second set of data is received that includes a second plurality of objects at a second level in the hierarchy. At least some of the second plurality of objects are displayed on the user interface display. The user interface display provides infinite scrolling of the first plurality of objects in a first portion of the user interface display and infinite scrolling of the second plurality of objects in a second portion of the user interface display.

17 Claims, 21 Drawing Sheets

SCALABLE HIERARCHICAL USER INTERFACE DISPLAY

BACKGROUND

1. Technical Field

This application relates generally to techniques for user interfaces, and more particularly, techniques used in connection with displaying hierarchical information in a user interface.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the single storage system allows the host systems to share data stored therein.

In connection with a data storage system, computer system, or more generally, any system, software may be utilized which includes a user interface (UI) such as, for example, software used in connection with performing system management. It may be desirable to provide a UI for the management application or other software which displays information to the user in a useful, efficient and scalable manner.

SUMMARY OF THE INVENTION

In accordance with one aspect of the invention is a method of displaying data comprising: receiving a first set of data including a first plurality of objects at a first level in a hierarchy; displaying at least some of the first plurality of objects on a user interface display; selecting from the user interface display a first object from the at least some of the first plurality of objects displayed on the user interface display; responsive to selecting the first object, receiving a second set of data including a second plurality of objects at a second level in the hierarchy; and displaying at least some of the second plurality of objects on the user interface display, wherein said user interface display provides for infinite scrolling of the first plurality of objects in a first portion of the user interface display and for infinite scrolling of the second plurality of objects in a second portion of the user interface display. The hierarchy may include a plurality of levels of objects, each object in the hierarchy corresponding to any of a physical or logical entity in a system represented using the hierarchy. Each object in the second plurality of objects may be a child object of the first object selected. The second plurality of objects may include a parent object of the first object selected. The hierarchy may be a hierarchy of relationships among entities in a virtual infrastructure. The hierarchy may include one or more objects at a first level each representing a hypervisor manager, one or more objects at a second level each representing a hypervisor managed by a hypervisor manager represented by an object at said first level, one or more objects at a third level each representing a virtual machine managed by a hypervisor represented by an object at said second level, and one or more objects at a fourth level each representing a logical device having storage provisioned for use by a virtual machine. Each of the virtual machines may be represented by an object at the third level where the virtual machine stores data on provisioned storage of a logical device representing by an object at the fourth level. Responsive to scrolling through the first plurality of objects, additional data objects may be received and displayed in the first portion of the user interface display using infinite scrolling. As the additional data objects are displayed, at least some of the first plurality of objects may no longer displayed. A first memory, that stores the at least some of the first plurality of objects no longer displayed, may be reused for storing the additional data objects. The first memory may include a plurality of memory portions for storing a plurality of undisplayed objects of the first plurality of objects. The method may also include determining any of an age and a distance from a current cursor location in the first portion of the user interface display for each of the plurality of undisplayed objects stored in a corresponding one of the plurality of memory portions; ranking said plurality of memory portions in accordance with criteria including any of the age and the distance of each of the plurality of undisplayed objects stored in a corresponding one of the plurality of memory portions; and reusing said plurality of memory portions in an order based on said ranking. The first plurality of objects may be a first type and said second plurality of objects may be a second type different from the first type, wherein each of said first type and said second type represent a different type of physical or logical entity represented using the hierarchy. The infinite scrolling in the first portion of the user interface display may result in displaying additional objects of the first type in the first portion when scrolling downward in the first portion, and wherein said infinite scrolling in the second portion of the user interface display may result in displaying additional objects of the second type in the second portion when scrolling downward in the second portion, and wherein scrolling in the first portion may be performed independently of scrolling in the second portion. The second portion of the user interface display may be included within the first portion of the user interface display. The first plurality of objects may be determined in accordance with criteria used to initially sort and display information presented in the user interface display, wherein said criteria identifies a level in the hierarchy at which objects are sorted in connection with rendering information in the user interface display in said displaying at least some of the first plurality of objects.

In accordance with another aspect of the invention is a system comprising: a plurality of virtual machines; a plurality of hypervisors each executing on a host, wherein each of the plurality of hypervisors manages a portion of the plurality of virtual machines; a plurality of hypervisor managers each executing on a host and each managing a portion of the plurality of hypervisors in connection with data storage management; a data storage system including a plurality of storage devices, wherein each of the plurality of virtual machines stores data on storage provisioned on at least one of the plurality of storage devices; a memory including code stored therein which, when executed by a processor, performs processing comprising: receiving a first set of data including a first plurality of objects of a hierarchy representing the plurality of hypervisor managers; displaying at least some of the first plurality of objects on a user interface display; selecting from the user interface display a first object from the at least some of the first plurality of objects displayed on the user interface display, said first object representing a first of the plurality of hypervisor managers; responsive to selecting the first object, receiving a second set of data including a second plurality of objects of the hierarchy representing a portion of the plurality of hypervisors managed by the first hypervisor manager; and displaying at least some of the second plurality of objects on the user interface display, wherein said user interface display provides for infinite scrolling of the first set plurality of objects representing the plurality of hypervisor managers in a first portion of the user interface display and for infinite scrolling of the second plurality of objects representing the portion of the plurality of hypervisors managed by the first hypervisor manager in a second portion of the user interface display. The hierarchy may include a plurality of levels, and wherein a first of the plurality of levels may include one or more objects each representing a hypervisor manager, a second of the plurality of levels may include one or more objects whereby each object of the second level represents a hypervisor managed by a hypervisor manager represented by an object at said first level, a third of the plurality of levels may include one or more objects whereby each objects of the third level represents a virtual machine managed by a hypervisor represented by an object at said second level, and a fourth of the plurality of levels may include one or more objects whereby each object of the fourth level represents a logical device having storage provisioned for use by a virtual machine represented by an object of the third level.

In accordance with another aspect of the invention is a computer readable medium comprising code stored thereon for displaying data, the computer readable medium comprising code stored thereon for: receiving a first set of data including a first plurality of objects at a first level in a hierarchy; displaying at least some of the first plurality of objects on a user interface display; selecting from the user interface display a first object from the at least some of the first plurality of objects displayed on the user interface display; responsive to selecting the first object, receiving a second set of data including a second plurality of objects at a second level in the hierarchy; and displaying at least some of the second plurality of objects on the user interface display, wherein said user interface display provides for infinite scrolling of the first plurality of objects in a first portion of the user interface display and for infinite scrolling of the second plurality of objects in a second portion of the user interface display. The hierarchy may include a plurality of levels of objects, each object in the hierarchy corresponding to any of a physical or logical entity in a system represented using the hierarchy. Each object in the second plurality of objects may be a child object of the first object selected.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
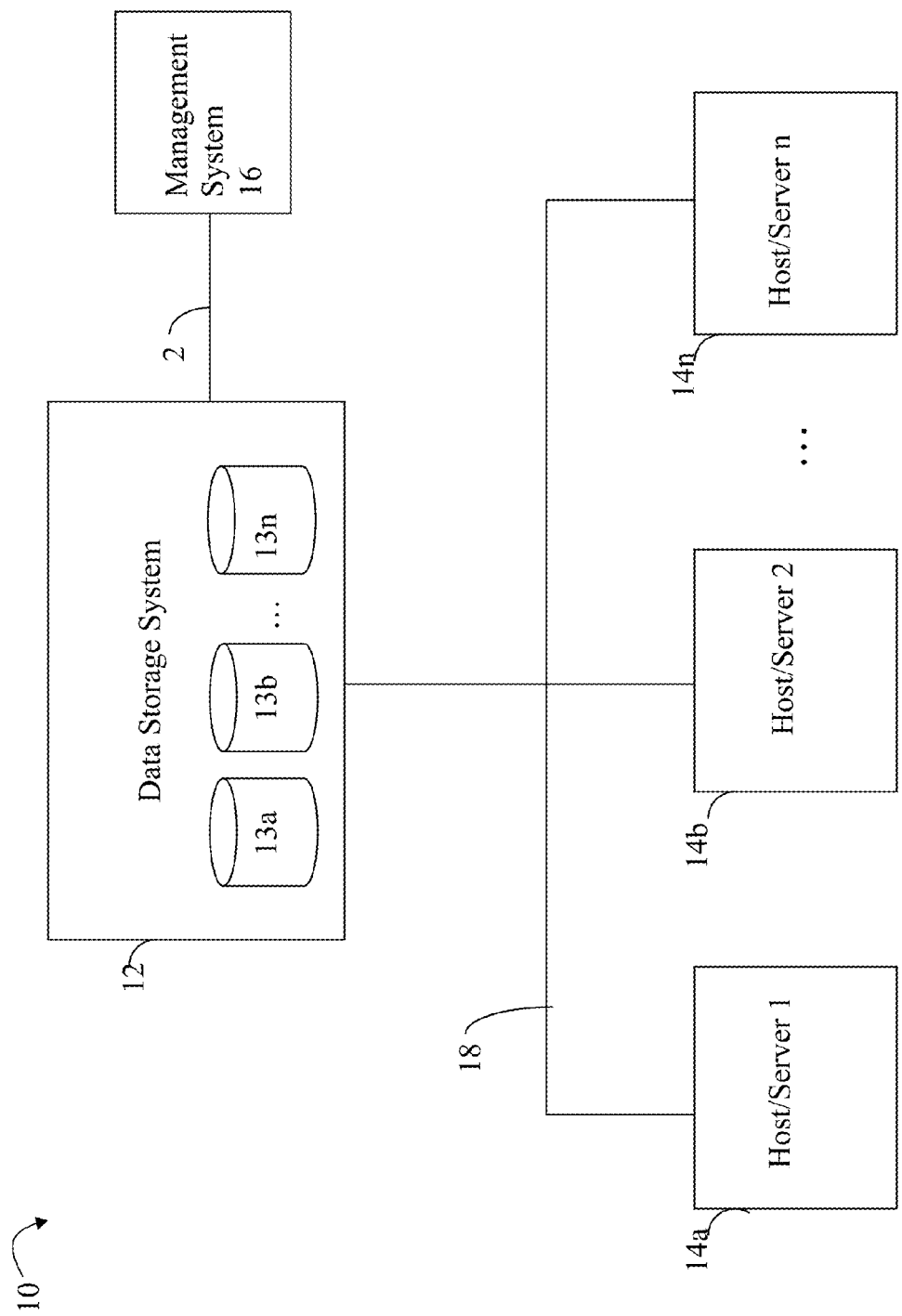
FIGS. 1, 1A, and 1B are examples of embodiments of systems that may be used in an embodiment in accordance with techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems, such as data storage arrays, offered by EMC® Corporation of Hopkinton, Mass. For example, an embodiment in accordance with techniques herein may include the VNXe™ data storage system by EMC® Corporation. Each of the data storage systems may include one or more data storage devices 13a-13n, such as disks. One or more data storage systems may be manufactured by one or more different vendors. Each of the data storage systems included in 12 may be inter-connected (not shown). As mentioned above, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 1A:
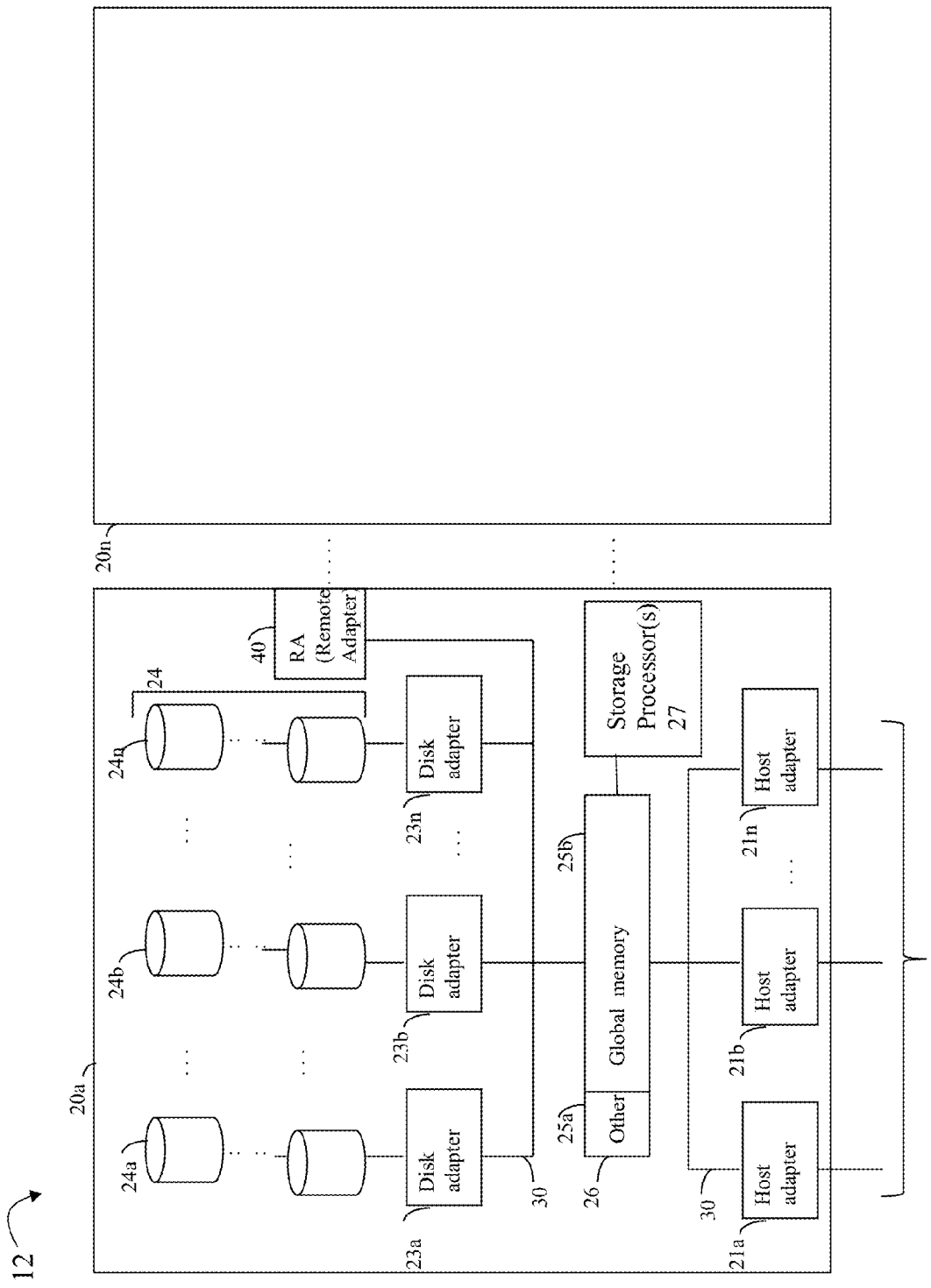

Referring to FIG. 1A, shown is an example of an embodiment of the data storage system 12 that may be included in the system 10 of FIG. 1. Included in the data storage system 12 of FIG. 1A are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks, drives, or more generally, data storage devices, 24a-24n. It should be noted that elements 24a-24n generally represent one or more different data storage devices analogous to elements 13a-13n of FIG. 1. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNXe™ data storage system by EMC Corporation includes two storage processors. The system 20a may also include one or more host adapters ("HAs") or directors 21a-21n. Each of the HAs may be used to manage communications and data operations between one or more host systems and the memory 26. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs (remote adapters), and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. In some embodiments of a data storage system, the memory 26 may be partitioned into two or more portions such as a global memory portion 25*b* and one or more other portions 25*a*. For example, in some embodiments of a data storage system including a single storage processor 27, the global memory portion 25*b* may be used to facilitate data transfers and other communications between the DAs, HAs and RAs in a data storage system. The DAs 23*a*-23*n* may perform data operations using a cache that may be included in the global memory 25*b*, for example, in communications with other disk adapters or directors, and other components of the system 20*a*. The other portion 25*a* is that portion of memory that may be used in connection with other designations that may vary in accordance with each embodiment.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, an embodiment of a data storage system, such as the VNXe™ data storage system by EMC Corporation, may include multiple storage processors each with their own memory used for communication between the different front end and back end components rather than utilize a global memory accessible to all storage processors. In such embodiments, memory 26 may represent memory of each such storage processor.

The particular data storage system as described in this embodiment, or a particular device thereof, such as a disk or other storage device, should not be construed as a limitation. Other types of commercially available data storage systems, as well as processors and hardware controlling access to these particular devices, may also be included in an embodiment.

With reference back to FIG. 1, client software on the management system 16 may be used in connection with performing data storage system management by issuing commands to the data storage system 12 and/or receiving responses from the data storage system 12 over connection 2. In one embodiment, the management system 16 may be a lap top or desk top computer system.

Described in following paragraphs are techniques that may be performed by executing code of management software, for example, of the management system 16. Such code may be used in connection with performing data storage system management and administration. Although following paragraphs describe such techniques with reference to embodiments with data storage systems, it will be appreciated by those of ordinary skill in the art that techniques herein have broader applicability for use in connection with any suitable system and components. In following examples, the client management software for performing data storage system management may also be located on other systems in connection with performing techniques herein.

In connection with description set forth herein, the host may be characterized in one aspect as a client of the data storage system having storage provisioned on the data storage system. The provisioned storage may include one or more LUNs that are accessible or visible to a host, or more generally any client of the data storage system, over one or more paths between the client and data storage system. Each path may be defined as including two endpoints, a first on the client and a second on the data storage system. The first endpoint on the client may be an initiator port of a component such as an HBA of the host used in connection with communicating with the data storage system such as to send I/O requests to store and/or retrieve data on provisioned devices of the data storage system. The second endpoint of the data storage system may be a target port of the data storage system such as a port of an FA of the data storage system used in connection with communicating with the client. A client may have access to one or more LUNs included in a defined storage group (SG). In the example described below, each initiator port may be configured to have access to LUNs of only a single SG. Each initiator port may be configured to have access to a set of one or more target ports of the data storage system through which all LUNs of the single SG are accessible or visible. The foregoing information regarding defined paths, SG definitions, what LUNs and SGs are accessible over what paths, and the like, may be included in a data storage system configuration or topology. Such topology may change over time as changes are made to an existing data storage system configuration, for example, by adding/removing hosts thereby adding/removing paths, adding/removing LUNs from existing SGs, adding/removing HBAs to existing hosts thereby adding/removing paths, and the like. Other embodiments utilizing techniques herein may have different restrictions and variations than that as provided herein in an exemplary embodiment for purposes of illustration.

In connection with a data storage system, system management may be performed using a server, such as a data storage system management service of the data storage system, and a client, such as using client management software executing on a host. Generally, the client may issue requests to the server for information used in connection with data storage system management. Such information may relate to, for example, existing data storage configuration or topology, health and status information of data storage system components, and the like. Information regarding the data storage system configuration or topology may include, for example, identifying all paths between a host and the data storage system over which provisioned storage is accessible or visible, identifying a particular host initiator port (e.g., of an HBA) and data storage system target port (e.g., of an FA of the data storage system) included in a path, identifying what one or more LUNs are accessible over one or more paths, identifying what one or more LUNs are accessible from a particular host initiator port, identifying what data storage system target ports are accessible to a host having one or more host initiator ports, identifying what host initiator ports may be used to access storage through a particular data storage system target port, identifying what target initiator ports may be used to access storage through a particular host initiator port, identifying paths that may be used to access a particular LUN, and the like. The particular information requested and utilized by the client may vary with the particular tasks the client performs at any point in time. The client may request an initial set of information from the server and then perform subsequent requests at later points in time, for example, to obtain information regarding any updates to the existing topology or configuration. Some examples of updates or changes are described above. Such updates may also include, for example, changes in connection with health or status of an existing component of the data storage system such as an indicator about whether a data storage system port is operable/can be used access LUNs.

In some embodiments, information regarding the topology or data storage configuration may be stored in a database of the data storage system. The database may be queried as needed in response to receiving a request from a client, such as the client management software, for information. Once the requested information is obtained from the database, the data storage system may return the requested data to the client management software.

Figure 1B:
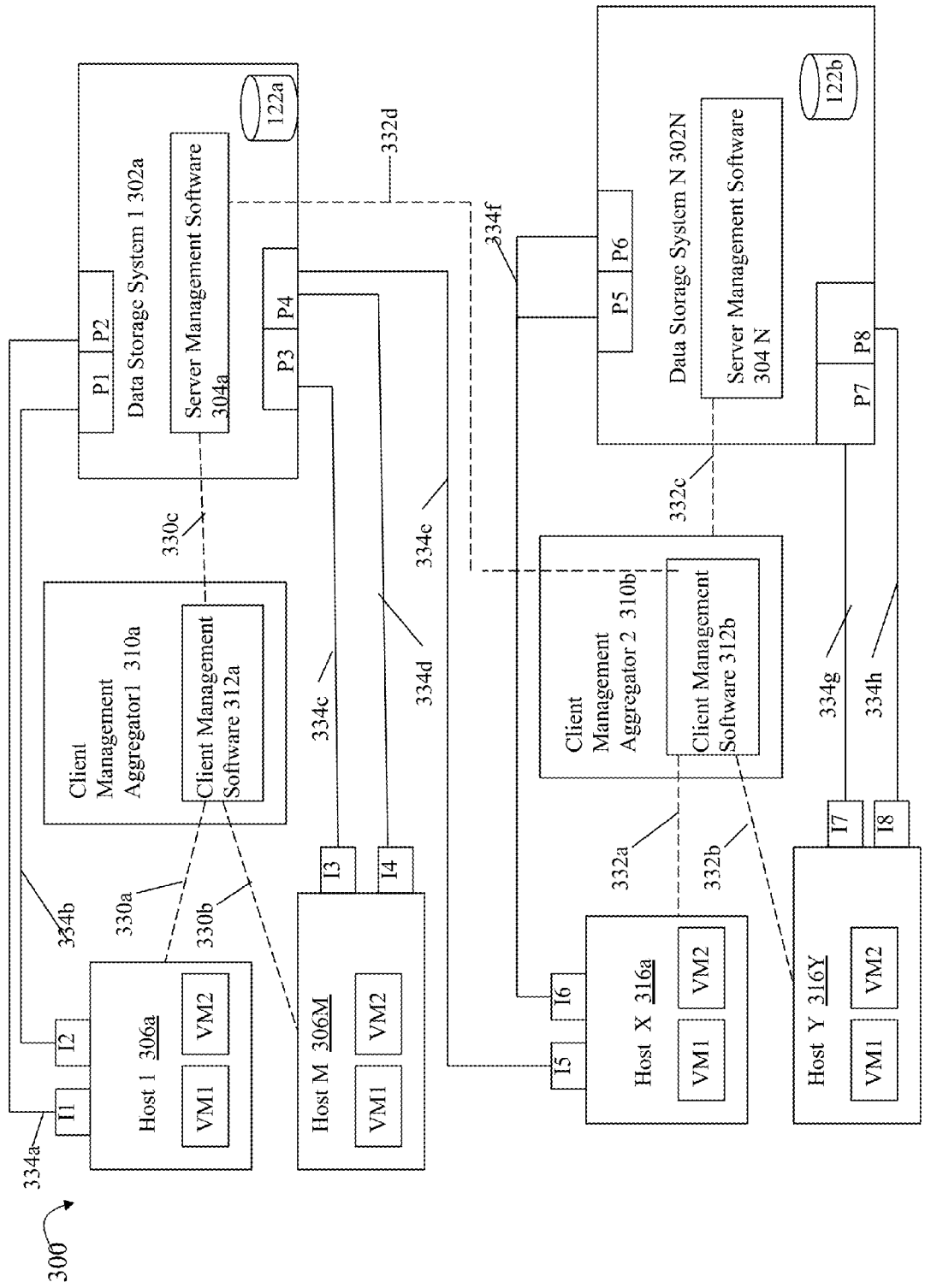

With reference now to FIG. 1B, shown is an example of an embodiment which may utilize techniques described herein. In the example 300, included are hosts 306a, 306M, hosts 316a,316Y, client management aggregators 310a, 310b, and data storage systems 302a,302N. Initiator ports of the hosts are denoted as 11-18. Target ports of the data storage systems are denoted as P1-P8. Solid lines 334a-334h denote data paths used for transmitting I/O operations or data requests and requested data between connected components (e.g., between a host and a data storage system). Dashed lines 330a-330c, and 332a-332d denote management or control paths between aggregator 310a and hosts 306a, 306M, between aggregator 310a and data storage system 302a, between aggregator 310b and hosts 316a, 316Y, between aggregator 310b and data storage system 302a and between aggregator 310b and data storage system N.

Each of the hosts and data storage systems may be as described elsewhere herein with the difference that the hosts 306a, 306M and the hosts 316a,316Y may each not include client management software and each such host may also provide a virtualized environment including one or more virtual machines (VMs) for executing applications on each such host. Each VM may have an application executing in the context of the VM where the application's data is stored on provisioned storage devices (not illustrated) of one or more of data storage systems 302a,302N. Each of the hosts 306a, 306M and the hosts 316a,316Y may include a hypervisor that performs VM management in connection with multiple VMs such as VMware ESX Server by VMware, Inc. Such a hypervisor, or more generally, VM manager, of each host having VMs executing therein may be installed and run directly on host hardware without requiring an underlying operating system. Each of the VM managers may perform management of the underlying host's physical resources for use among the multiple VMs that can run simultaneously.

Each of the client management aggregators 310a, 312b may function as host management aggregators or centers providing data storage management for a plurality of hosts or, more generally clients of the data storage system. For example, aggregator 310a may be used to perform data storage management and configuration for hosts 306a,306M connected to 310a over various management or control paths 330a, 330b. In a similar manner, aggregator 310b may be used to perform data storage management and configuration for hosts 316a,316Y connected to 310b over various management or control paths 332a, 332b. Each of 310a, 310b may include software thereon for performing such management for multiple hosts running virtualized environments as illustrated. For example, each of 310a, 310b may include VMware vCenter™ Server software that provides for a central, scalable and extensible platform for virtual nation management of multiple virtualized hosts. In connection with techniques herein, each of the aggregators 310a, 310b may include, respectively, client management software 312a, 312b. Thus, the aggregators 310a, 310b may function as an intermediate component between the virtualized hosts and the data storage systems. In this manner, aggregator 310a may communicate with data storage system 302a and hosts 306a,306M where system 302a has storage provisioned thereon for use by the hosts 306a,306M. Similarly, aggregator 310b may communicate with data storage systems 302a,302N and hosts 316a, 316Y where systems 302a, 302N have storage provisioned thereon for use by the hosts 316a,316Y.

Generally, each aggregator 310a, 310b may perform management for one or more hosts where each such host may have one or more initiator ports included in data paths to one or more data storage systems 302a, 302N. In a manner similar to that as described elsewhere herein for a. single host, an aggregator may perform management for one or more hosts and may therefore include client management software to perform processing as described herein with a usage context representing a collective or aggregate usage context for the one or more hosts being managed by the aggregator. Aggregator 310a may define its usage context as all objects related to a set of host initiators where the set is the collective or aggregate of all initiator ports for hosts managed by aggregator 310a. Aggregator 310b may define its usage context as all objects related to a set of host initiators where the set is the collective or aggregate of all initiator ports for hosts managed by aggregator 310b. To further illustrate, aggregator 310a is performing data storage configuration management for hosts 306a, 306M and may have a usage context identifying initiator ports 11-44. Aggregator 310b is performing data storage configuration management for hosts 316a, 316Y and may have a usage context identifying initiator ports 15-18. In this example, data storage system 302a has a single client aggregator 310a and data storage system 302N has two client aggregators 310a, 310b. Each aggregator may report data storage configuration information on the topology and health from the context or viewpoint of the hosts said aggregator is managing, Each of 310a, 310b may be a separate server system having a management console connected thereto upon which information may be displayed based on each aggregator's usage context, Each aggregator 310a, 310b may use such a view or context for reporting storage provisioned for use by any of its managed hosts, reporting on a status or health of components in paths used to access provisioned storage, and the like. The number of hosts of each aggregator 31.0a, 310b may generally be any number of hosts where each such aggregator 310a, 310b may perform management for a different number of such hosts. In connection with FIG. 1B, and more generally any of the examples and figures described herein, the particular number of components (e.g., number of hosts, number of aggregators, number of data storage systems, etc.) is for purposes of illustration and should not be construed as applying a limit to an embodiment in accordance with techniques herein.

It should be noted that the health and/or status information and data storage configuration information may be used by the aggregators 310a, 310b of FIG. 1B in performing different tasks. For example, one such task may be in connection with displaying requested information of a UI of client management software 312a, 312b.

In connection with FIG. 1B, the data management or control paths (e.g., such as denoted by the dashed lines) may be used in connection with management requests. For example, a user utilizing the UI of client management software 312a may issue a management request over 330c for different configuration information to be displayed on the UI in connection with the storage used by the hosts 306a-306M and VMs executing thereon. The data storage system's serve management software 304a may receive the management request and return requested information to the client management software 312a.

It should be noted that the various control paths and data paths may represent different logical paths between the illustrated components which may or may not be implemented using different physical connections and components.

The client management software 312a, 312b may use a defined API (application programming interface) when communicating with the server management software 304a, 304N. The server management software 304a, 304N may include one or more service providers which may perform processing to retrieve and return requested management information. The server management software 304a, 304N may include code that, when executed, queries the data storage configuration database 122a, 122b to retrieve the requested information which is then processed by the server management software 304a, 304N and returned to the requesting management software 312a, 312b.

What will be described in following paragraphs are techniques that may be used in connection with a user interface (UI) such as a graphical user interface (GUI) of the client management software 312a, 312b to display information in a scalable, useable, and efficient manner. Techniques herein may be used with hierarchical sets of data to provide users with the ability to view such hierarchical sets of data in a scalable manner. The UI display may further reflect or model the hierarchical relationships existing between multiple sets of data, different types of objects, and the like. Additionally, to provide for scalability in viewing information, techniques may provide for custom control to expand and collapse each element at each level of viewed information in the hierarchy and also provide infinite scrolling on each element type in the hierarchy. Such techniques may be described herein with respect to a particular exemplary hierarchy for illustration. However, as will be appreciated by those skilled in the art, techniques herein have much broader applicability and are not limited by the particular hierarchy and examples provided herein.

The example 300 of FIG. 1B illustrates a relationship between different entities in connection with management of the data storage system. In particular, described in following paragraphs is use of techniques herein with a management GUI to model the relationship between the client management aggregators 310a, 310b (also referred to herein as the hypervisor managers), the hypervisors (such as executing on hosts 306a, 306M, 316a, 316Y providing the virtualized environment for the various VMs executing thereon), the VMs, and the logical devices having storage provisioned thereon for storing data of the VMs. Techniques in following paragraphs and figures may provide users performing data storage system management, such as with a GUI, the ability to hierarchically view relationships between the different entities for the current data storage system configuration and topology in a scalable and efficient manner.

In order to visually display and model the relationships between the various entities noted above, data regarding the relationships therebetween for the current data storage system configuration and topology may be requested by software 312a, 312b as needed, respectively, from the data storage systems 302a, 302N. Generally, as described above in connection with FIG. 1B, a hypervisor manager (e.g., 310a, 310b) manages one or more hypervisors executing on one or more hosts (e.g., 306a, 306M, 316a, 316Y), whereby each such hypervisor may manage one or more VMs having data stored on logical devices of a data storage system (e.g., 302a, 302N).

Figure 1C:
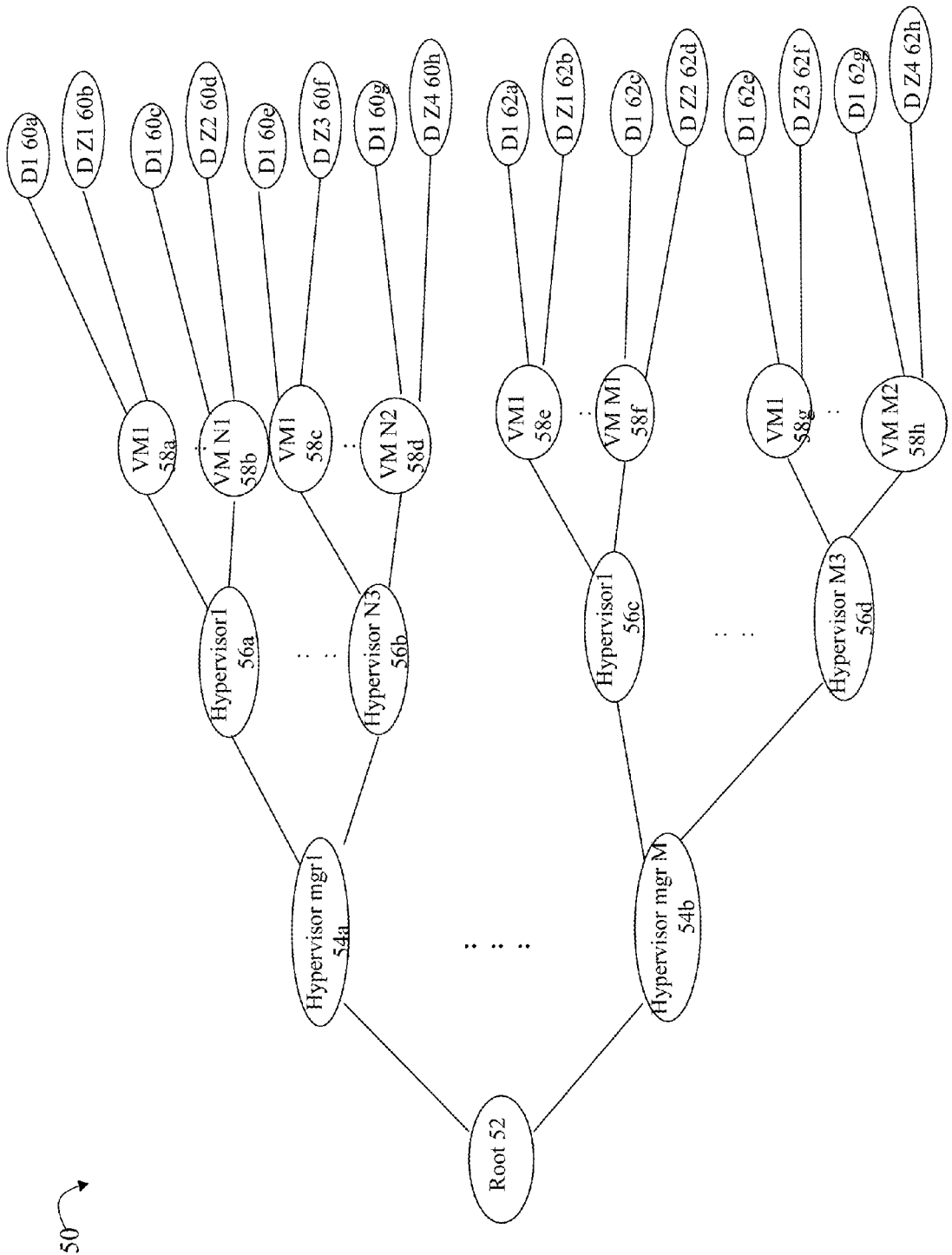
FIGS. 1C, 10A and 15 are examples of hierarchies of objects that may be used in an embodiment in accordance with techniques described herein.

Referring to FIG. 1C, shown is an example of an object hierarchy that may be used to represent or model the various hierarchical relationships in an embodiment in accordance with techniques herein. Information representing the objects and the hierarchy may be stored, for example, in the databases or data stores 122a, 122b of the data storage systems whereby portions of the information may be requested as needed by the client management software 312a, 312b. The example 50 may include an object for each element of the different types of entities represented. The lines between a pair of objects may represent the relationship between two such entities at different levels in the hierarchy. The example 50 is a hierarchy including a plurality of levels resembling a tree structure with a root node 52 at level 0, hypervisor manager (mgr) nodes 54a-b at level 1, hypervisor nodes 56a-d at level 2, VM nodes 58a-h at level 3, and logical storage device nodes 60a-h, 62a-h at level 4. Generally there may be any number of suitable levels in the hierarchy, nodes at each level, and the like, depending on the particular entities and relationships being represented. It should also be noted that in the hierarchy of the example 50, each level of the hierarchy includes nodes representing a different type of data or entity in the represented system. Each node at level N is a parent of any child nodes which appear at level N+1 and are connected to the parent. For example, hypervisor mgr 54a is a parent node of child nodes 56a-b. A path may be defined between the root node 52 and any other node in the hierarchy whereby the path includes all nodes which are connected and traversed in the path. For example, a path to VM1 58a may be represented as 52, 54a, 56a and 58a. As generally known in the art, descendants of a first node at level N are any nodes which are at levels higher than N and are directly or indirectly connected to the first node (e.g., the first node is included in a path from the root node to each of its descendant nodes). For example, nodes 58e-58f and 62a-d are descendant nodes of 56c. Ancestors of a first node at level N are any nodes which are at a level in the hierarchy less than N whereby an ancestor of the first node is included in a path from the root node to the first node at level N.

A user may view the information for the particular data storage system configuration represented as in the example 50 whereby the GUI provides the user with ability to search for requested information and relationships such as, for example, which VMs are managed by a particular hypervisor manager, which logical devices are used by a particular hypervisor or host, and the like.

Figure 2A:
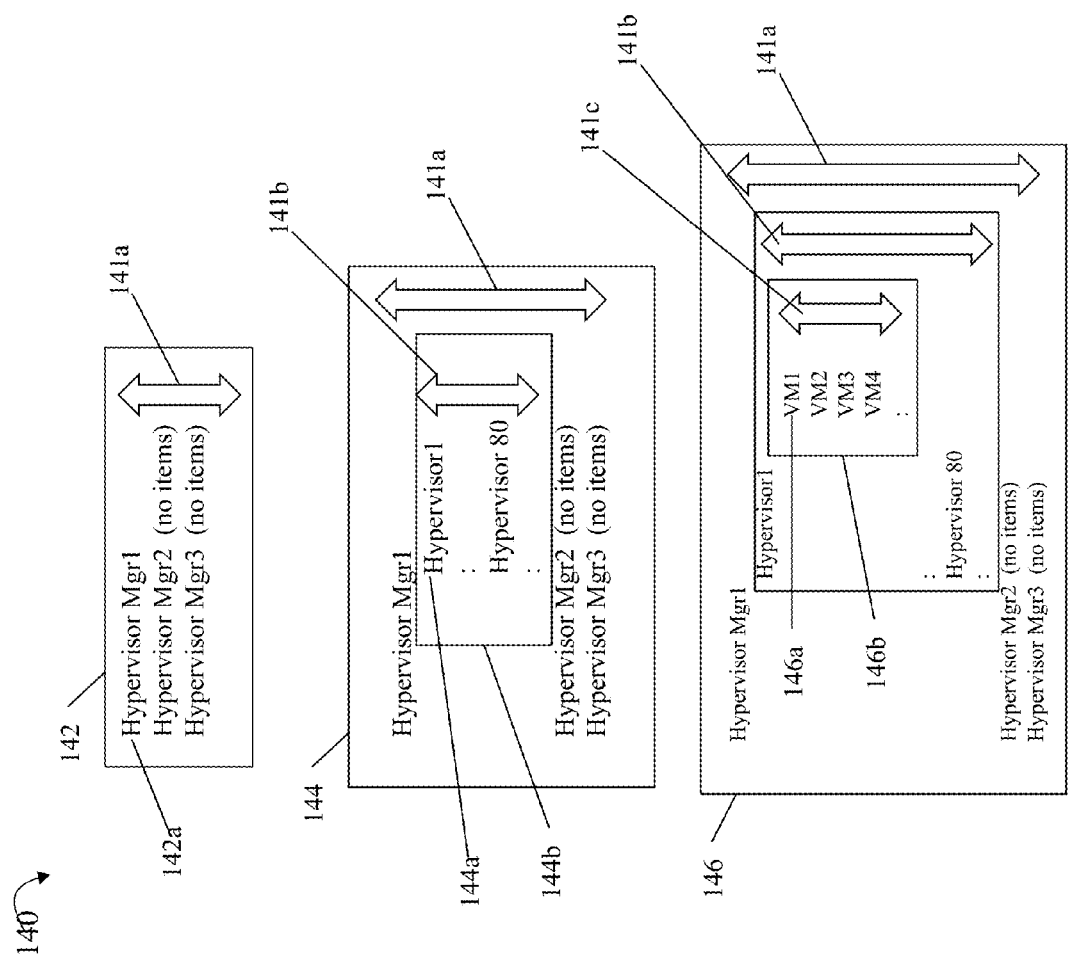
FIGS. 2A, 2B, 3, 4, 5, 6, 7 8, 9, 10, 11, 12, 13 and 14 are examples of user interface displays illustrating aspects of techniques described herein.

Referring to FIG. 2A, shown are various examples of information that may be displayed on a GUI in an embodiment in accordance with techniques herein based on the hierarchy of FIG. 1C. Element 142 is a first display at a first point in time whereby the information includes a list of hypervisor managers such as represented by objects at the first level in the hierarchy of FIG. 1C. The user may be provided with infinite scrolling 141a through the list of hypervisor mgrs. As known in the art, infinite scrolling may be characterized as a GUI design technique that provides displaying additional content in the display area 142 when scrolling through the list of hypervisor mgrs. (e.g., as such scrolling is performed to scroll up and/or down the list). For example, presuming that 3 hypervisor mgrs. may be displayed at a time in the area 142, there may be, for example 100 hypervisor mgrs., or more generally any suitable number. As the user scrolls down the list, the view including the particular 3 hypervisor mgrs. displayed also scrolls down the list so as to always display 3 hypervisor mgrs. However, the particular 3 hypervisor mgrs. included in the displayed view vary depending on where the user is in connection with scrolling up and/or down in the entire list of hypervisor mgrs. for the particular configuration. In this manner, the display area or portion 142 may be characterized as providing a view to a portion of the list of hypervisor mgrs. as the user scrolls through the list. Such scrolling may be performed in any suitable manner (e.g., mouse or tracking pad with finger). This is further illustrated in more detail with other figures and described in more detail below.

Element 142 may represent the information initially displayed on the GUI at a first point in time, such as when the client management software is first launched. A user may scroll through the list and select a particular hypervisor mgr about which additional details are displayed. In this example, the user may select hypervisor mgr1 as denoted by 142a.

Responsive to selecting 142a, the GUI display may be updated to include information as represented in 144. In particular, selection of 142a results in the additional information provided in display portion 144b. In this example, GUI display portion 144b includes a list of hypervisors managed by the selected hypervisor mgr1. Additionally, in the display portion 144b, the GUI provides for infinite scrolling 141b through the list of hypervisors managed by hypervisor mgr1, while also providing the user with the ability to independently and infinitely scroll 141a through list of hypervisor managers of 144.

At a second point in time, the user may select hypervisor 1 as denoted by 144a from the hypervisor list of 144b. Responsive to selecting 144a, the GUI display may be updated to include information as represented in 146. In particular, selection of 144a results in the additional information provided in display portion 146b. In this example, GUI display portion 146b includes a list of VMs managed by the selected hypervisor1 144a. Additionally, in the display portion 146b, the GUI provides for infinite scrolling 141c through the list of VMs managed by hypervisor1 while also providing the user with the ability to independently and infinitely scroll 141a through list of hypervisor managers of 144 and while also providing the user with the ability to independently and infinitely scroll 141b through the list of hypervisors managed by the selected hypervisor mgr1. Thus, the GUI provides the user with the independent infinite scrolling at three different levels (as denoted by 141a, 141b and 141c) for the particular elements selected at different levels in the hierarchy of displayed information.

At a third point in time, the user may select VM 1 as denoted by 146a from the VM list of 146b. Responsive to selecting 146a, the GUI display may be updated to include information as represented in the example 100 of FIG. 2B. In particular, selection of 146a results in the additional information provided in display portion 108. In this example, GUI display portion 108 includes a list of VM details for the selected VM1 146a. Additionally, in the display portion 108 the GUI provides for infinite scrolling 109 through the list of VM1 detail, while also providing the user with the ability to independently and infinitely scroll 107 through a list of VMs of 106 managed by the selected hypervisor1, while also providing the user with the ability to independently and infinitely scroll 105 through the list of hypervisors of 104 managed by the selected hypervisor mgr1, and while also providing the user with the ability to independently and infinitely scroll 103 through list of hypervisor managers of 102. Thus, the GUI provides the user with the independent infinite scrolling at now four different levels for the particular elements selected at different levels in the hierarchy of displayed information.

What will now be provided is further detail regarding how the infinite scrolling at the different levels for the selected elements may be implemented in one embodiment in accordance with techniques herein.

Figure 2B:
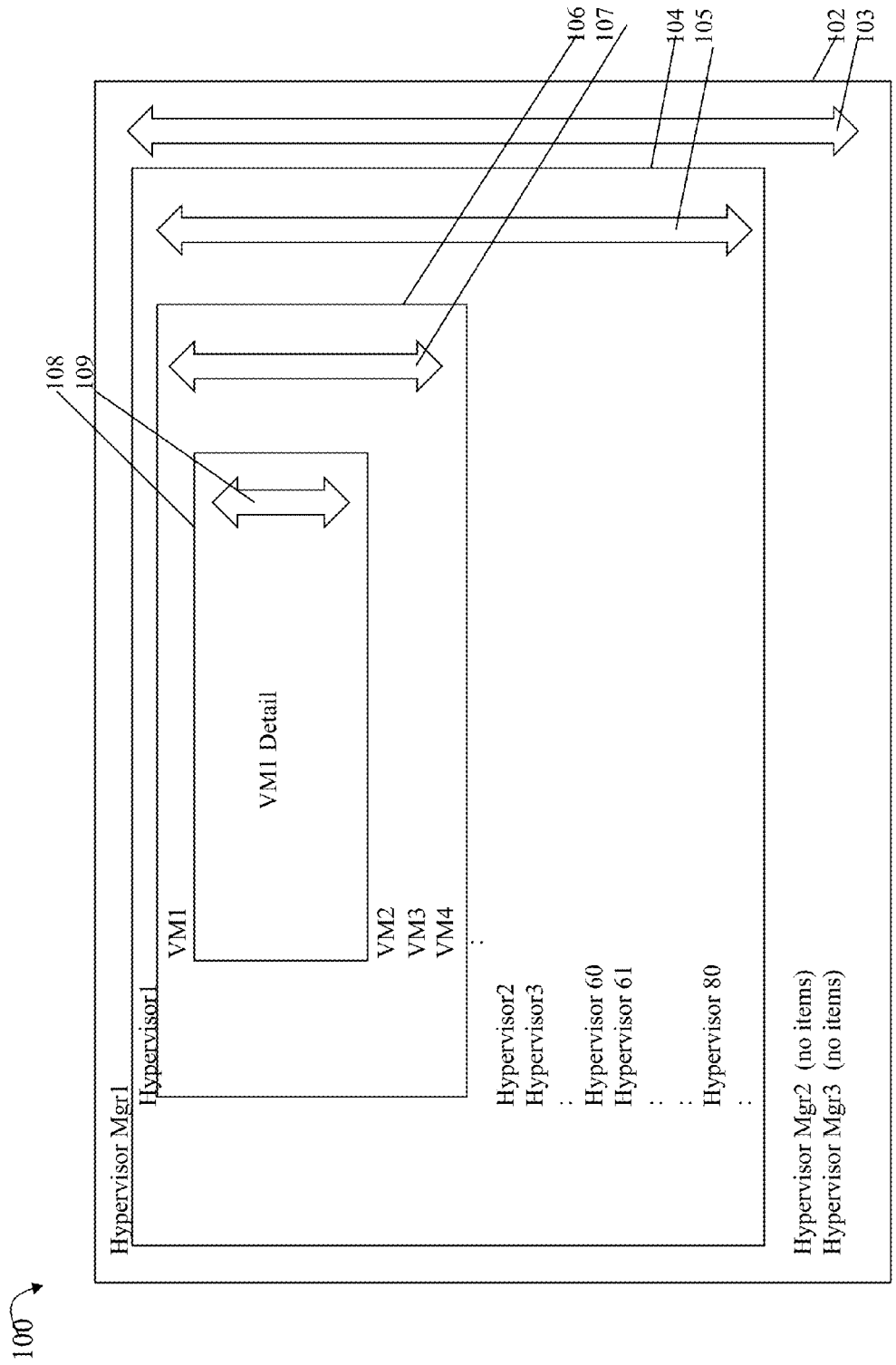
Figure 3:
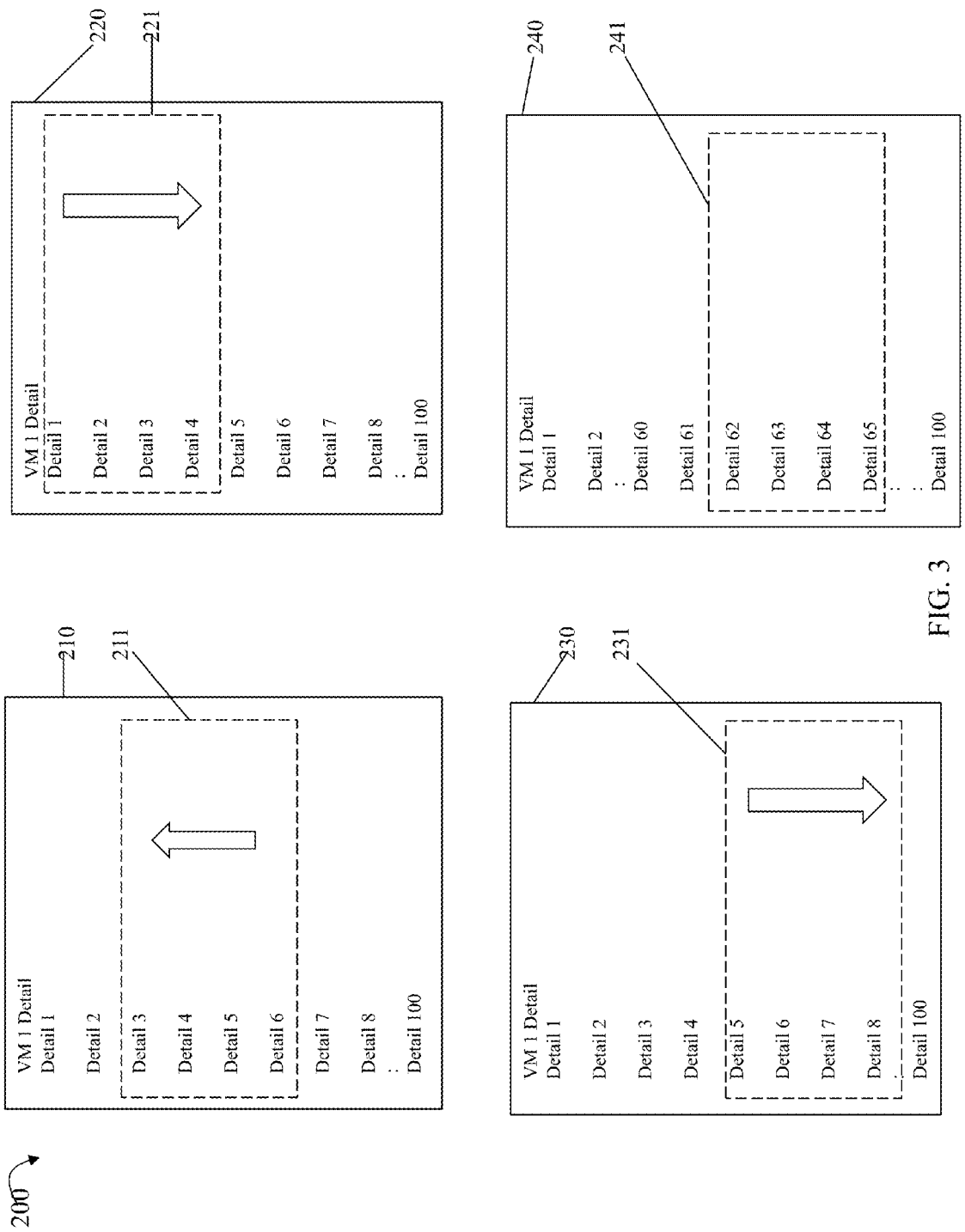

Referring to FIG. 3, shown are examples illustrating the information that may be displayed at various points in time when infinitely scrolling through the list of VM1 details such as provided in display area or portion 108 of FIG. 2B. At a first point in time, element 210 may represent a portion of the VM1 detail information that may be presented in the display area 108 with respect to a current scrolling position and associated view port 211. In other words, element 210 may represent the entire list of 100 elements of VM1 detail information where the user may scroll up and down to different positions in the list. Element 211 represents a current window corresponding to the current scrolling position within the list of VM1 details where the size of 211 indicates the information that may be displayed within the display area 108 at a first point in time. At the first point in time, the user may then scroll up the list to view detailed items prior to detail 3 as displayed in 211.

Responsive to scrolling up as illustrated in 210, the display area 108 may be updated to include the information as represented by view port 221 of 220. In this case, the user scrolled upwards in the list so that the 4 VM detailed items displayed changes from 211 to 221. At the second point in time, the user may then scroll down the list to view detailed items following detail 4 as displayed in 221.

Responsive to scrolling down as illustrated in 221, the display area 108 may be updated to include the information as represented by view port 231 of 230. In this case, the user scrolled downward in the list so that the 4 VM detailed items displayed changes from 221 to 231. At the third point in time, the user may then choose to further scroll down the list to view detailed items following detail 8 as displayed in 221.

Responsive to continuing to scroll further down in the list of VM1 detail as illustrated in 231, the display area 108 may be updated to include the information as represented by view port 241 of 240. In this case, the user scrolled further downward in the list so that the 4 VM detailed items displayed changes from 231 to 241.

Figure 4:
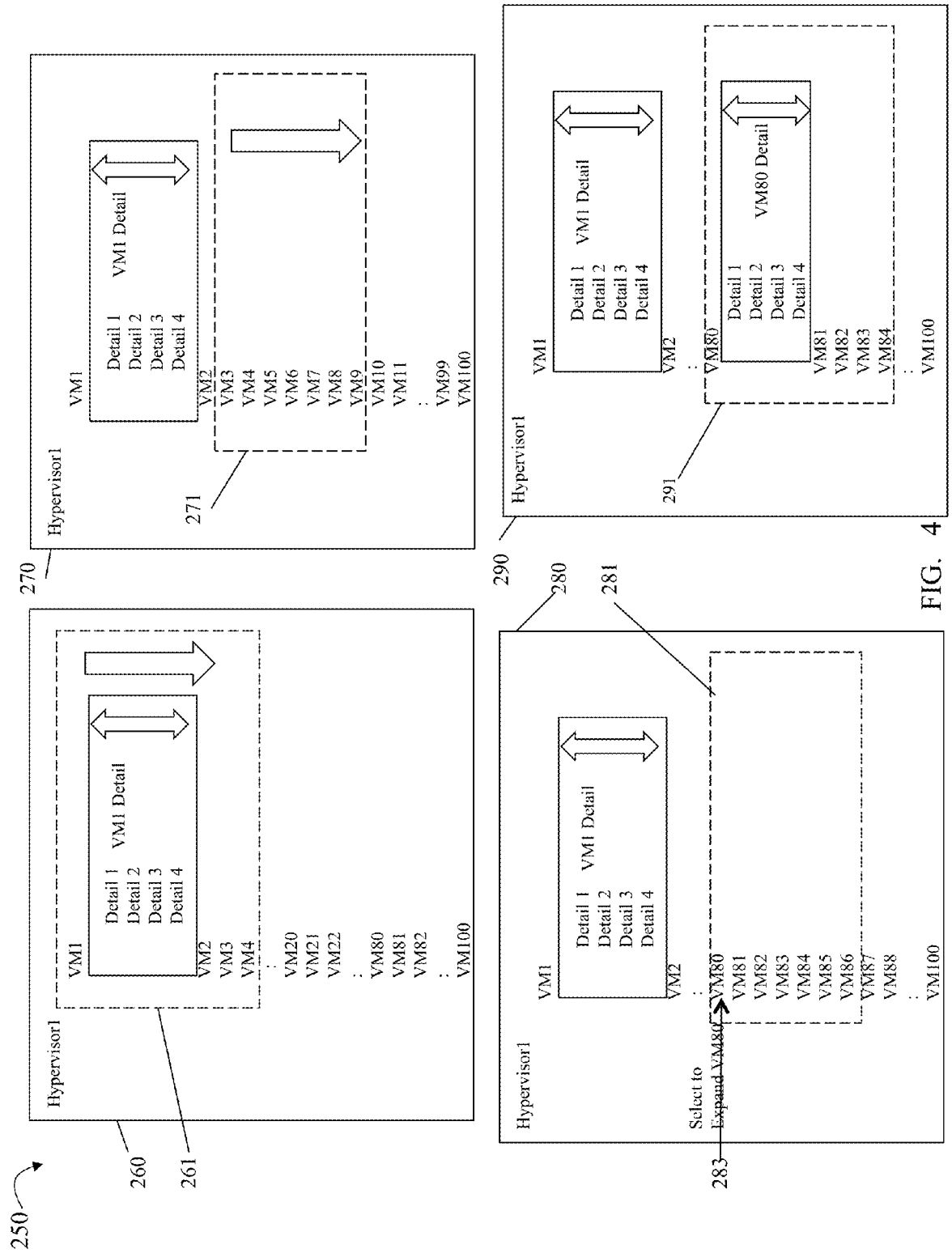
Figure 5:
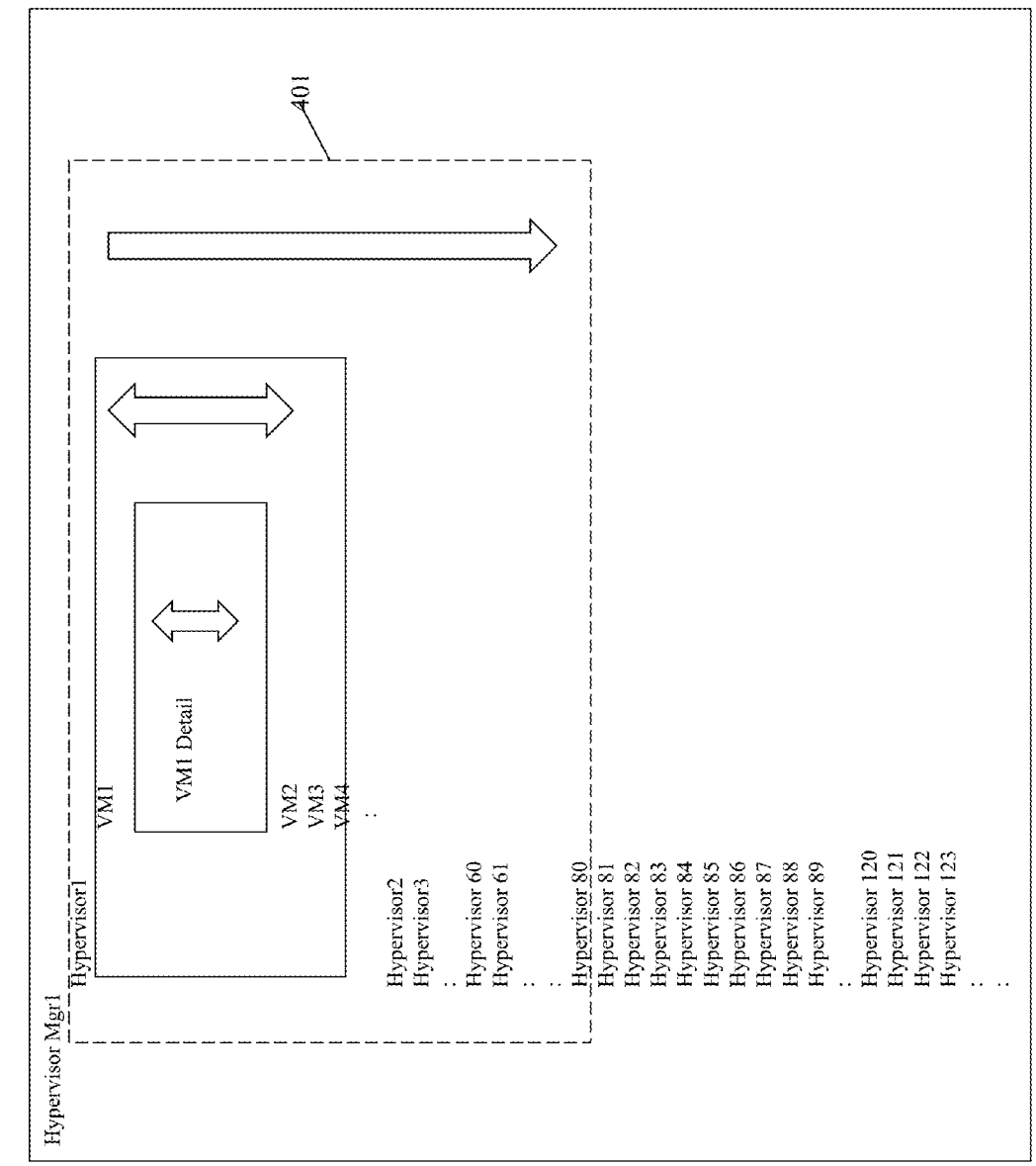

Referring to FIG. 4, shown are examples illustrating the information that may be displayed at various points in time when infinitely scrolling through the VM list such as provided in display area or portion 106 of FIG. 2B. At a first point in time, element 260 may represent that portion of the VM list presented in the display area 110 with respect to a current scrolling position and associated view port 261. In other words, element 260 may represent the entire list of 100 VMs for the selected hypervisor 1 where the user may scroll up and down to different positions in the VM list. Element 261 represents a current window corresponding to the current scrolling position within the list of VM list where the size of 261 indicates the information that may be displayed within the display area 106 at a first point in time. At the first point in time, the user may then scroll down the VM list to view VMs in the following VM4 as displayed in 261.

Responsive to scrolling down the VM list as illustrated in 261, the display area 106 may be updated to include the information as represented by view port 271 of 270. In this case, the user scrolled downwards in the list so that the VM list displayed changes from 261 to 271. At a second point in time, the user may then scroll yet further down the VM list to view VMs following VM 9 as displayed in 271.

Responsive to scrolling further down the VM list as illustrated in 271, the display area 106 may be updated to include the information as represented by view port 281 of 280. In this case, the user scrolled downward in the list so that the display area 106 is updated from 271 to 281. At a third point in time, the user may then choose to expand VM80 thereby requesting for display further VM details for the selected VM 80 (as denoted by 283).

Responsive to selecting VM80 as illustrated by 283, the display area 106 may be updated from 281 to 291 to include the additional VM detail for the selected VM 80. In this manner, the user may be further provided with infinite scrolling within the VM 80 detailed information in a manner similar to that as provided with the VM1 detail as described elsewhere herein. Thus, a user may select an element for expansion and further detail where infinite scrolling may be provided when viewing the displayed further detailed information.

Referring to FIGS. 5-9, shown are examples illustrating the information that may be displayed at various points in time when infinitely scrolling through the hypervisor list for hypervisor mgr1 such as provided in display area or portion 104 of FIG. 2B. At a first point in time, the example 400 may represent that portion of the hypervisor list presented in the display area 104 with respect to a current scrolling position and associated view port 401. In other words, 400 may represent the portion of the entire list of hypervisors for the selected hypervisor mgr1 where the user may scroll up and down to different positions in the hypervisor list. Element 401 represents a current window corresponding to the current scrolling position within the list of hypervisors where the size of 401 indicates the information that may be displayed within the display area 104 at a first point in time. At the first point in time, the user may then scroll down the hypervisor list to view hypervisors in the list following hypervisor 80 as displayed in 401.

Figure 6:
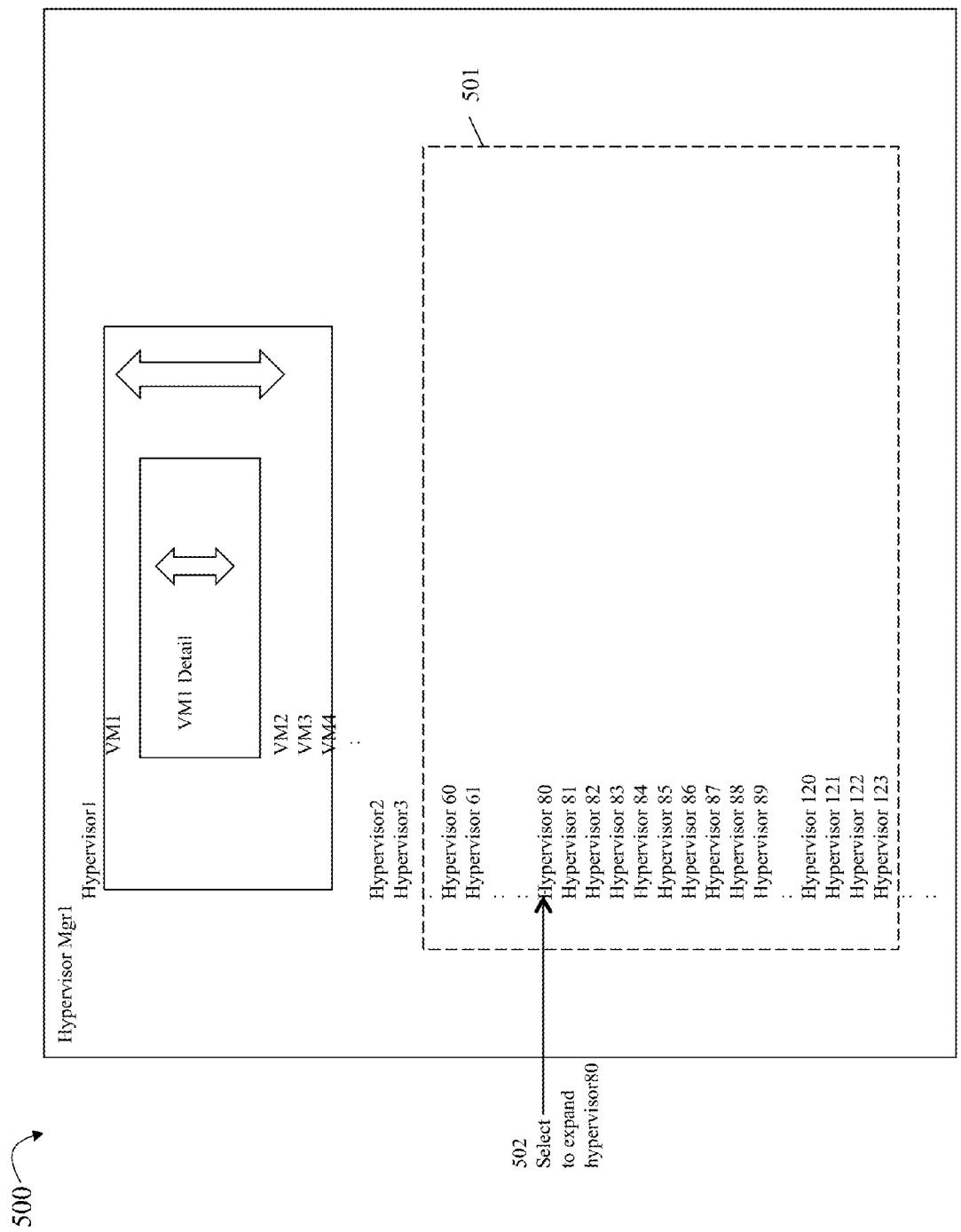

Responsive to scrolling down the hypervisor list as illustrated in 401, the display area 104 may be updated to include the information as represented by view port 501 of the example 500 in FIG. 6. In this case, the user scrolled downwards in the hypervisor list so that the information displayed in area 104 changes from 401 to 501. At a second point in time with reference to FIG. 6, the user may then select hypervisor 80 from the list thereby requesting for display further hypervisor details/information for the selected hypervisor 80 (as denoted by 502).

Figure 7:
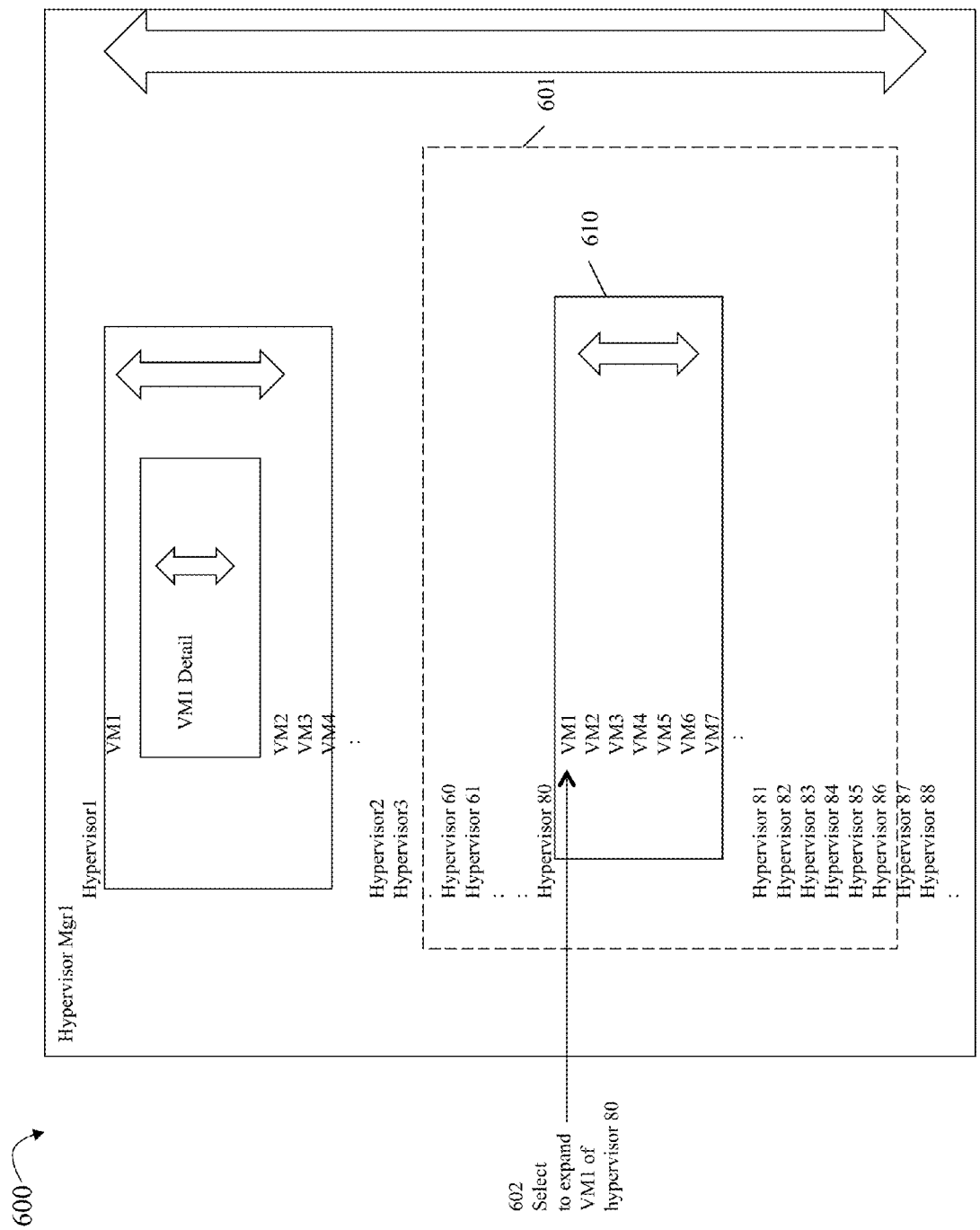

Responsive to selecting hypervisor 80 as illustrated by 502, the display area 104 may be updated from 501 of FIGS. 6 to 601 of FIG. 7 thereby including a list of VMs 610 as the additional information for the selected hypervisor 80. In this manner, the user may be further provided with infinite scrolling within the VM list 610 for selected hypervisor 80 in a manner similar to that as provided with other selected and expanded items as described herein. Thus, a user may select an element for expansion and further detail where infinite scrolling may be provided when viewing the displayed further detailed information.

At a third point in time with reference to FIG. 7, the user may then select a VM from the VM list of 610 thereby requesting for display further VM details/information for the selected VM1 of hypervisor 80 (as denoted by 602).

Figure 8:
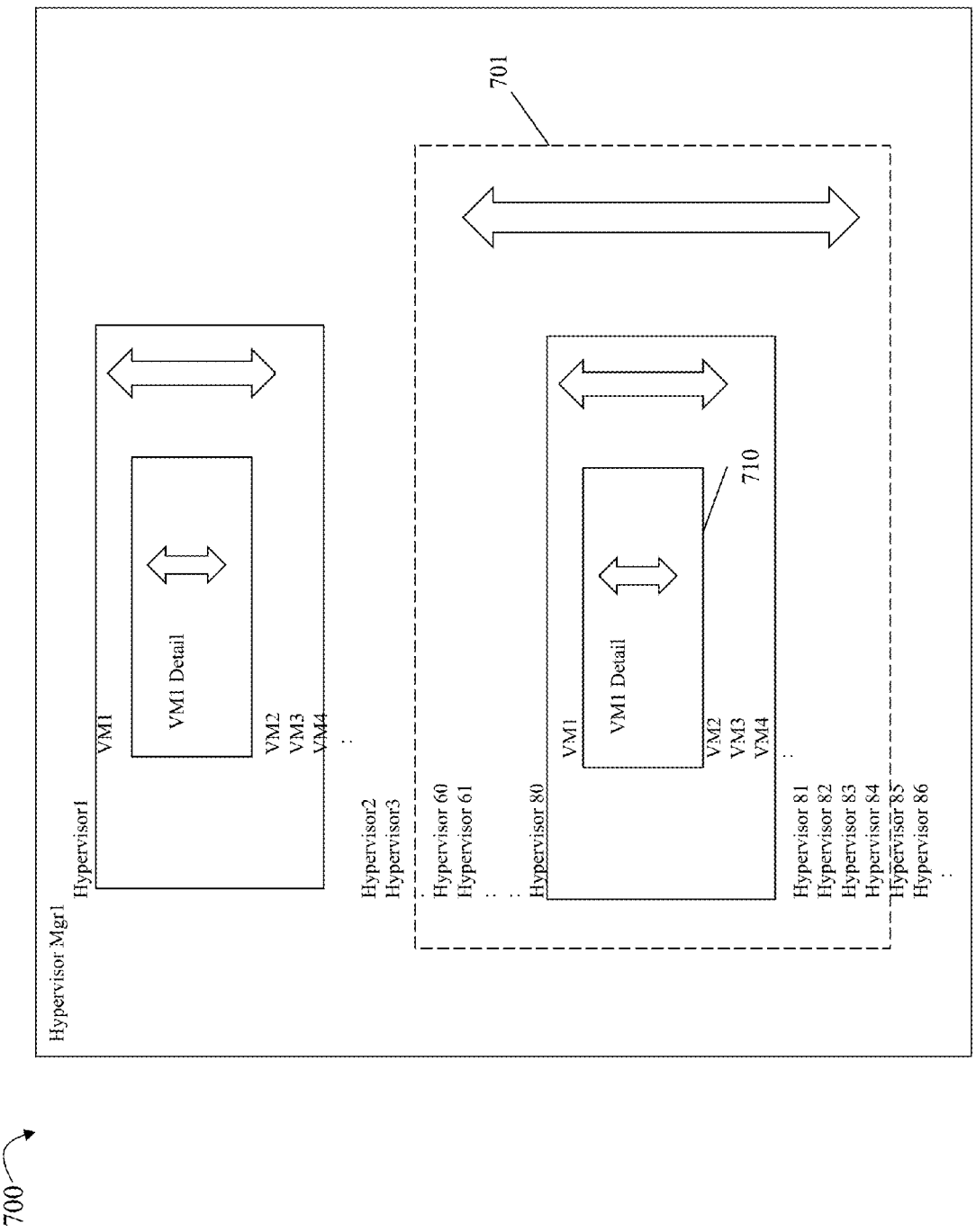

Responsive to selecting VM1 of hypervisor 80 as illustrated by 602, the display area 104 may be updated from 601 of FIGS. 7 to 701 of FIG. 8 thereby including a VM 1 details 710 as the additional information for the selected VM1 of hypervisor 80. In this manner, the user may be further provided with infinite scrolling within the VM 1 detail information in 710 for selected VM1 of hypervisor 80 in a manner similar to that as provided with other selected and expanded items as described herein. Thus, a user may select an element for expansion and further detail where infinite scrolling may be provided when viewing the displayed further detailed information.

Figure 9:
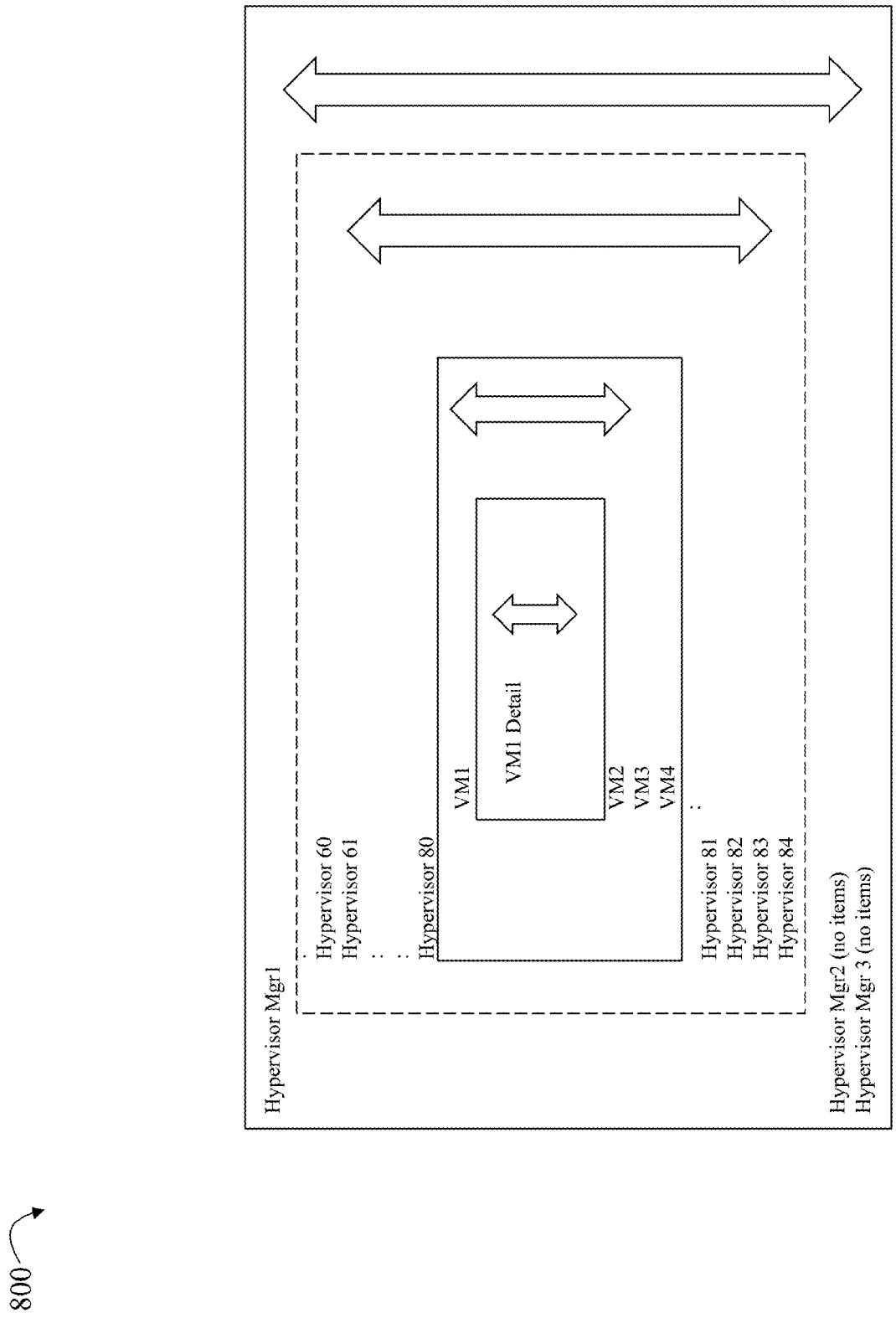

As with other figures described above, FIG. 8 provides an indication with viewport 701 with respect to a current scrolling position in the list of hypervisors for hypervisor mgr1. FIG. 9 shown the resulting UI display in accordance with the viewport 701 of FIG. 8 but without the additional detail of where the user is in connection with relative scrolling within the entire list of hypervisors for hypervisor mgr1.

Figure 10:
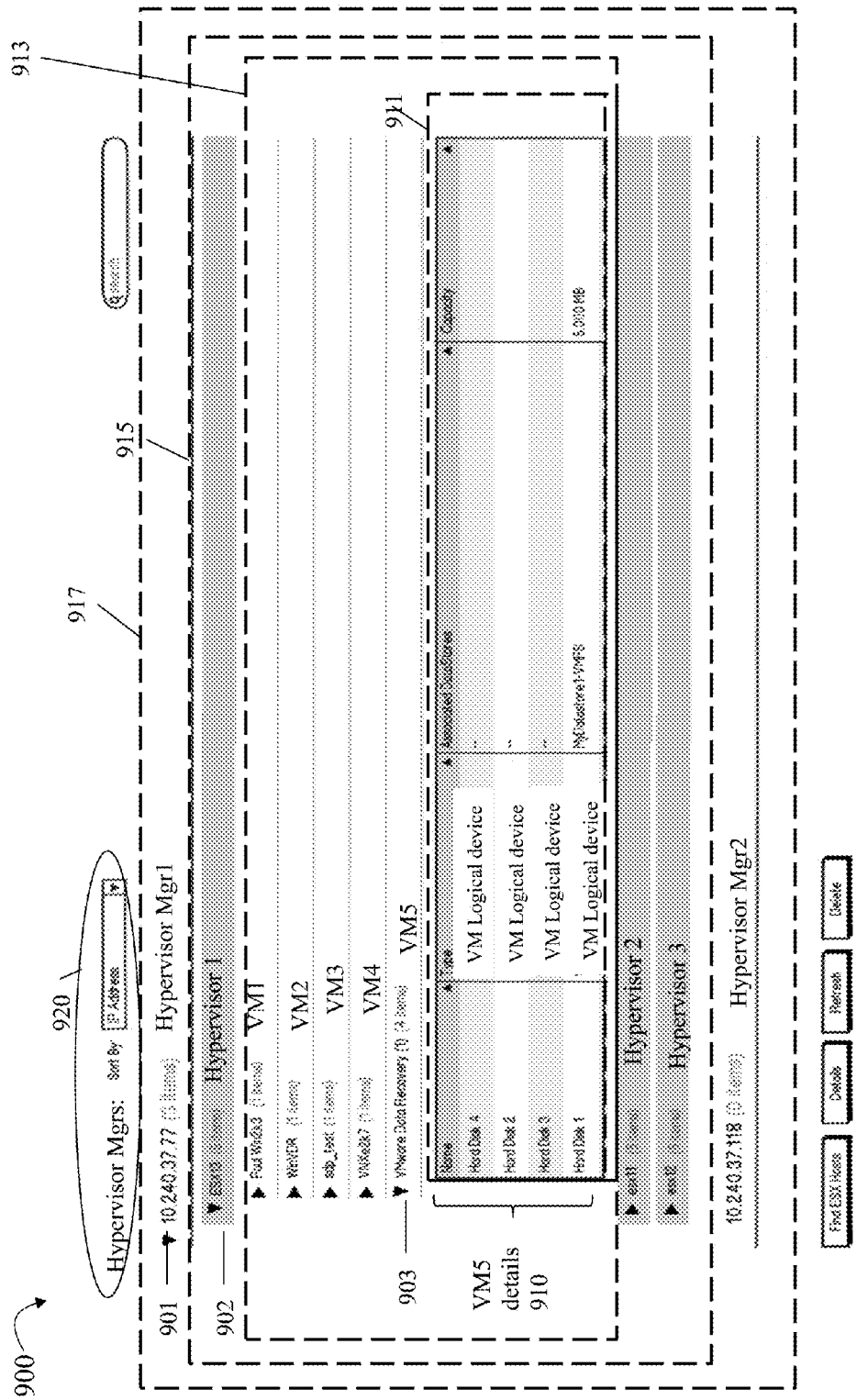

Referring to FIG. 10, shown is example providing further information that may be displayed in connection with hypervisor mgrs., hypervisors, and VMs in an embodiment in accordance with techniques herein. The example 900 illustrates further detail regarding information that may be included in the VM details, what information may be displayed regarding hypervisor mgrs., and the like. In this example 900 the user has selected hypervisor mgr1 901 from the hypervisor mgr list, selected hypervisor 1 902 of hypervisor mgr1, and select VM5 903. Consistent with discussion elsewhere herein, such selections may be made in sequential order as just described to further drill down and display more detailed information at various levels for different selected entities in the hierarchy. As also described herein, to facilitate viewing information at each of the levels, infinite scrolling may be provided for the list of hypervisor mgrs., for the list of hypervisors of the selected hypervisor mgr1, for the list of VMs of the selected hypervisor1 and for the list of VM details for the selected VM5. In this example, the VM5 details 910 may include a list of VM logical devices of storage provisioned for use by the selected VM5. As described elsewhere herein, infinite scrolling may be provided in the display area 911 for the VM5 details, infinite scrolling may be provided in display area 913 for the VM list of selected hypervisor1, infinite scrolling may be provided in display area 915 for the hypervisor list for selected hypervisor mgr1, and infinite scrolling may be provided in display area 917 for the list of hypervisor mgrs.

Figure 10A:
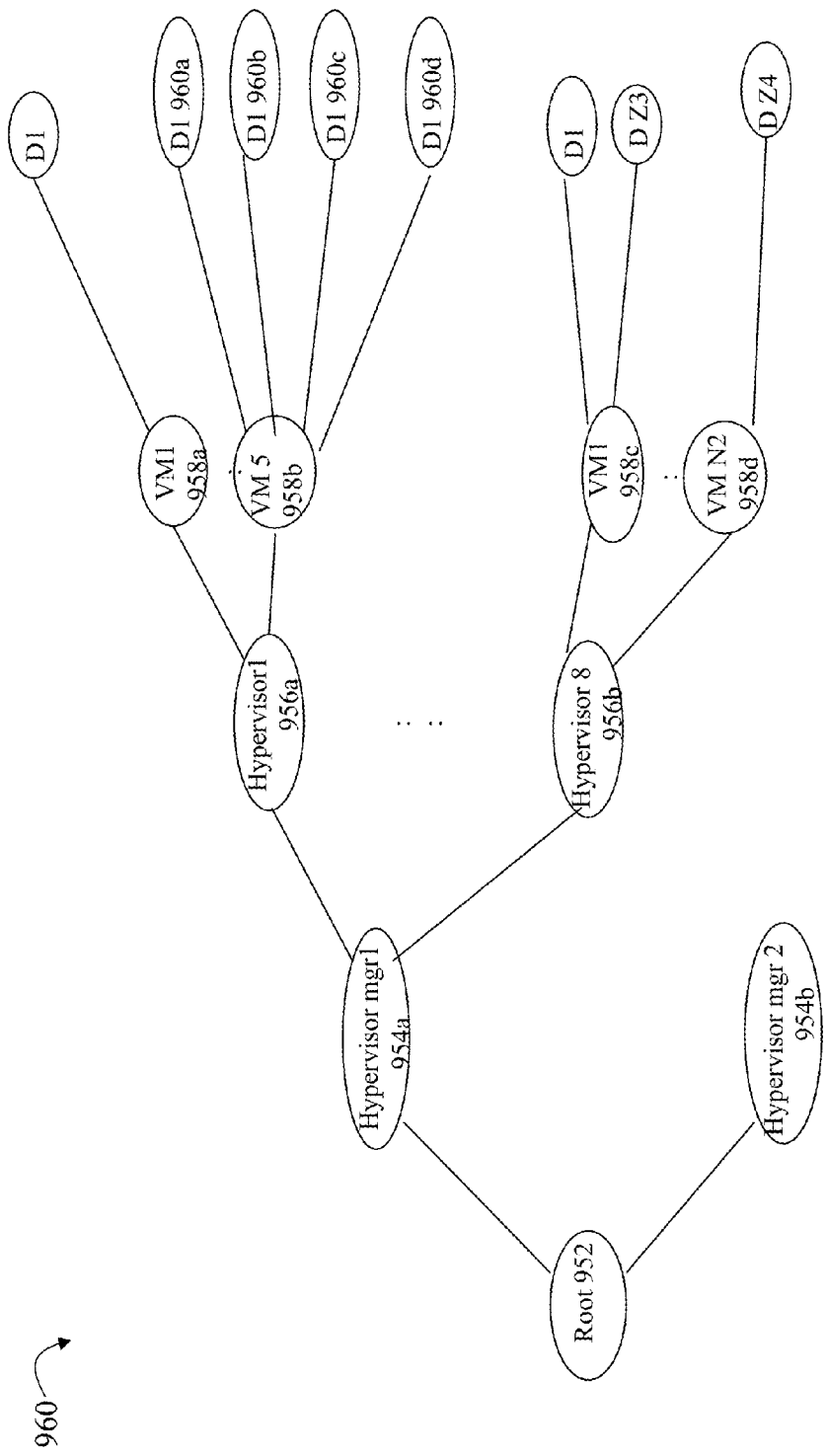

The particular sequence of nodes selected corresponds to objects at different levels of the hierarchy representing a path in the hierarchy such as of FIG. 1C. Referring to FIG. 10A, shown is an example 960 of the hierarchy corresponding to information as displayed in connection with FIG. 10. As described above, the user may select hypervisor mgr1 corresponding to node 954a at level 1, may select hypervisor 1 corresponding to a node 956a at level 2, and may select VM5 corresponding to a node 958b at level 3. Displayed in area 911 may be various logical devices represented, respectively, by nodes 960a-d. For simplicity, VM5 958b is shown as having only 4 logical devices. However, if there are more than 4 logical devices of provisioned storage for use by VM5, node 958b would include more than 4 child nodes 960a-d whereby information for various ones of the logical devices may be displayed in area 911 of FIG. 10 depending on the user's currently selected scrolling position in the VM5 detailed list of logical devices.

Additionally, the example 900 of FIG. 10 also includes criteria 920 specifying how to sort or ranking the displayed information. The criteria 920 may indicate a level within the hierarchy, such as hypervisor mgr, and sorting criteria, such as IP address, used to sort and display information in the GUI. With reference to FIG. 10, the criteria indicates to sort and display the information at the hypervisor mgr level in increasing order of IP address associated with each hypervisor mgr.

An embodiment may also provide functionality which allows a user to change the foregoing criteria thereby altering the way in which data storage management information is sorted and presented in the GUI. For example, a user may want to sort and present information for display beginning at a different level in the hierarchy than at level 1 for the hypervisor mgrs. Thus, a user may specify the primary sorting criteria at a level in the hierarchy other than the hypervisor manager. For example, a user may select to sort the information based on an alphabetic listing of VM names. The sorting of VMs may be with respect to one or more hypervisor managers. In this manner, all the VMs across all hypervisors and all hypervisor managers may be displayed and the user may further select a particular VM.

Figure 11:
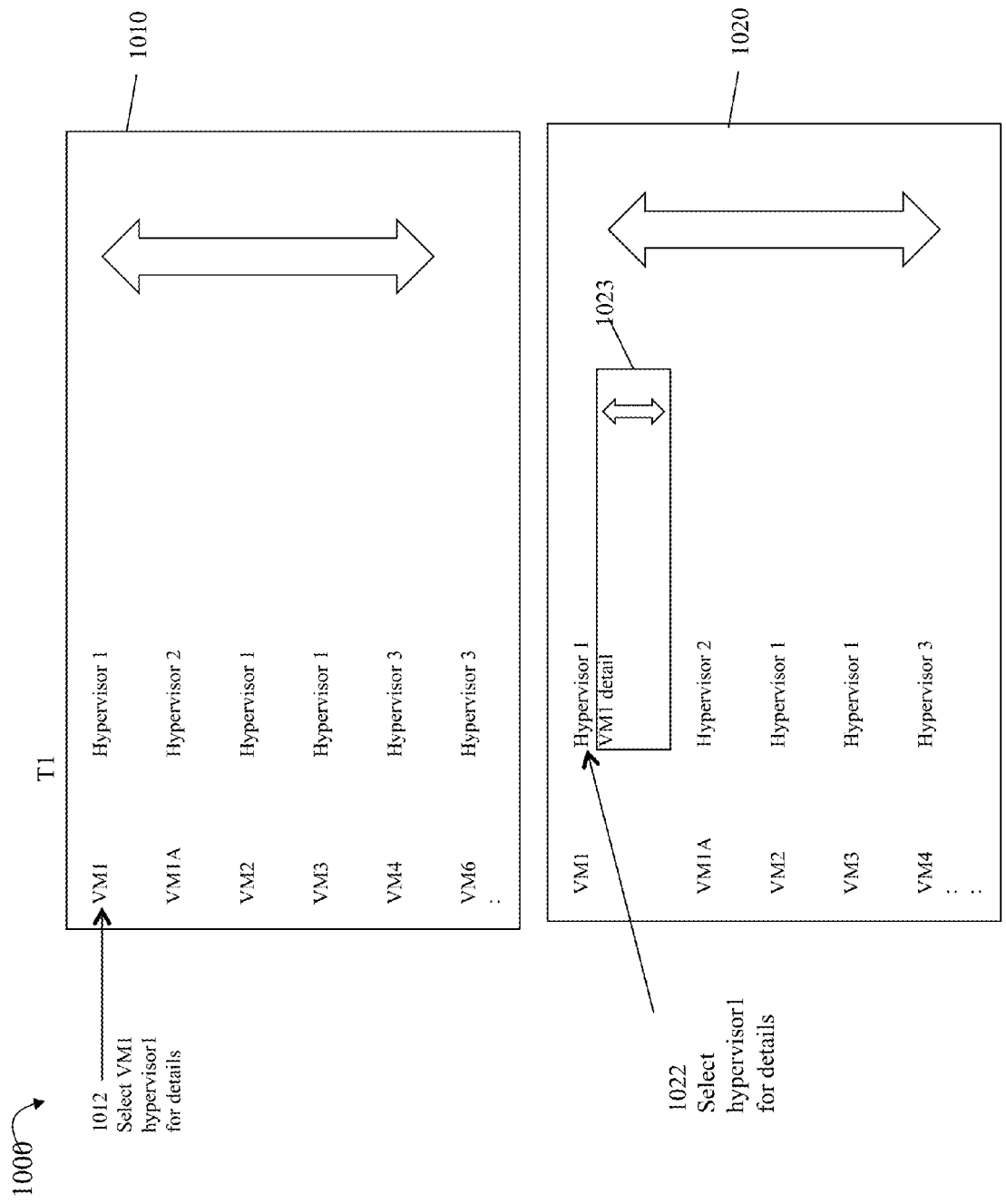
Figure 12:
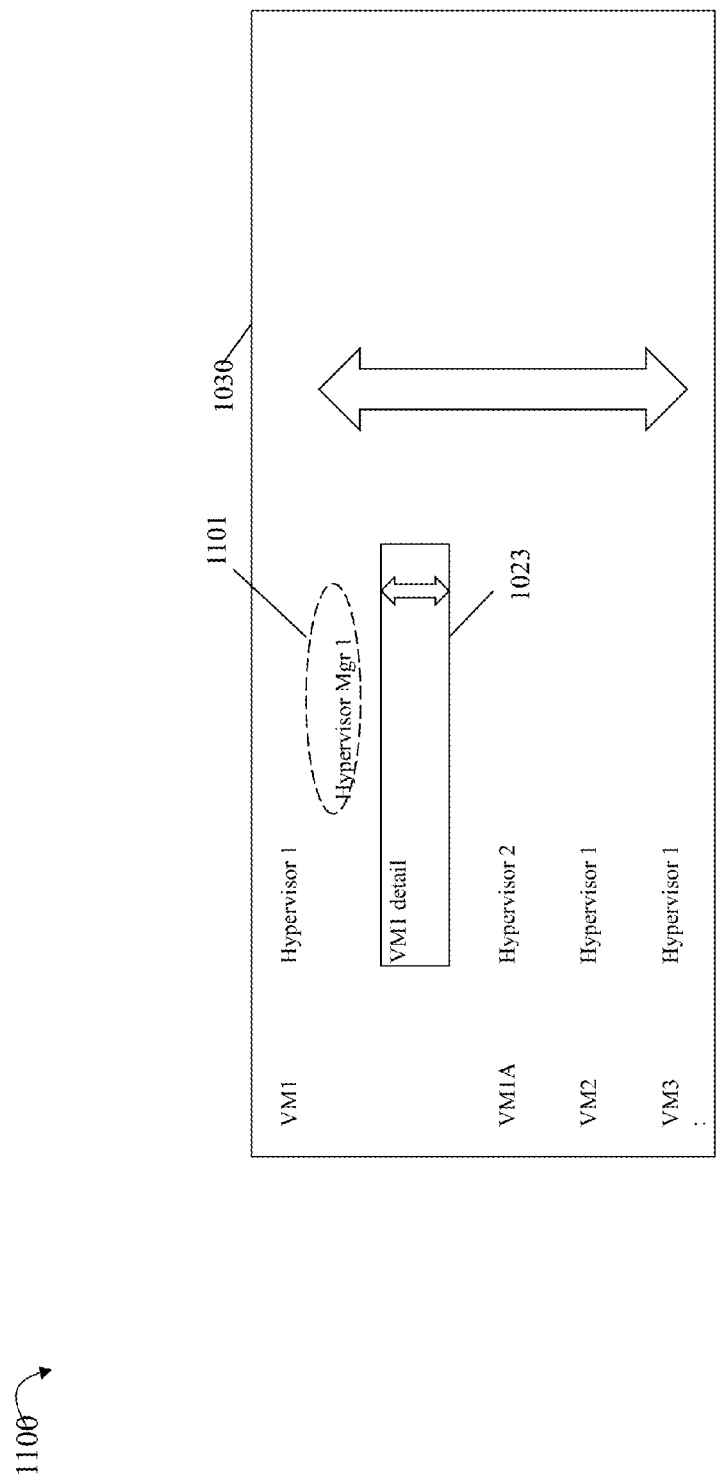

To further illustrate the foregoing, reference is made to FIGS. 11 and 12. In FIG. 11, at a first point in time, a user may specify sorting criteria to sort or rank all VMs across all hypervisors and all hypervisor mgrs. Thus, as a starting point for the information displayed, the user has specified criteria which indicates to list all VMs corresponding to level 3 in the hierarchy (with reference to FIG. 1C). In response, the GUI display may be populated with data as represented in 1010 where infinite scrolling may be provided for scrolling through the aggregated and sorted VM list of 1010. Each VM included in the displayed information of 1010 may also identify the hypervisor that manages the VM. Thus, an embodiment may allow a user to sort and display information at a particular level in the hierarchy. Additionally, the displayed information may also include other information from other nodes/objects associated with or related to the displayed nodes/objects. For example, element 1010 provides for infinite scrolling through a sorted VM list (e.g., sorted list of VM objects of level 3 in the hierarchy). The VM list may be sorted based on ascending alphabetic order for the VM name. Additionally, for each displayed VM, the hypervisor that manages the VM is displayed whereby the hypervisor has a corresponding object in the hierarchy at level 2. This relationship regarding a particular hypervisor managing a VM may be denoted by the VM object/node at level 3 having a parent hypervisor object/node representing the managing hypervisor at level 2 in the hierarchy. The particular information displayed regarding details of nodes/objects related to the displayed VM objects may vary with embodiment.

Consistent with description and other examples herein, at a second point in time, a user may now may a selection from the displayed VM list of 1010 to further expand and provide additional detail regarding the selected VM. For example, assume a user selects 1012 VM1 of hypervisor 1 in 1010. Responsive to selecting VM1 1012, the display area may be updated from 1010 to 1020 whereby 1020 now includes VM1 detail area 1023. Infinite scrolling may be provided within area 1023 of the VM1 detail. Thus, responsive to selecting 1012, VM1 detail information at level 4 in the hierarchy, such as the list of logical devices used by VM1, may be displayed for infinite scrolling in area 1023.

At a third point in time, the user may select 1022 the hypervisor 1 which is the listed hypervisor managing the selected VM1. Responsive to selecting 1022 hypervisor 1, the display area may be updated from 1020 to 1030 as in FIG. 12. In particular, selection of 1022 results in displaying additional information 1101 indicating that hypervisor mgr1 manages the selected hypervisor1 1022. Thus, user selections may result in displaying additional information regarding related or associated nodes at level 4 (e.g., VM1 detail information regarding logical devices provisioned for used by selected VM1) and also level 2 (e.g., hypervisor mgr1 which manages the selected hypervisor 1, whereby hypervisor 1 manages selected VM1).

Figure 13:
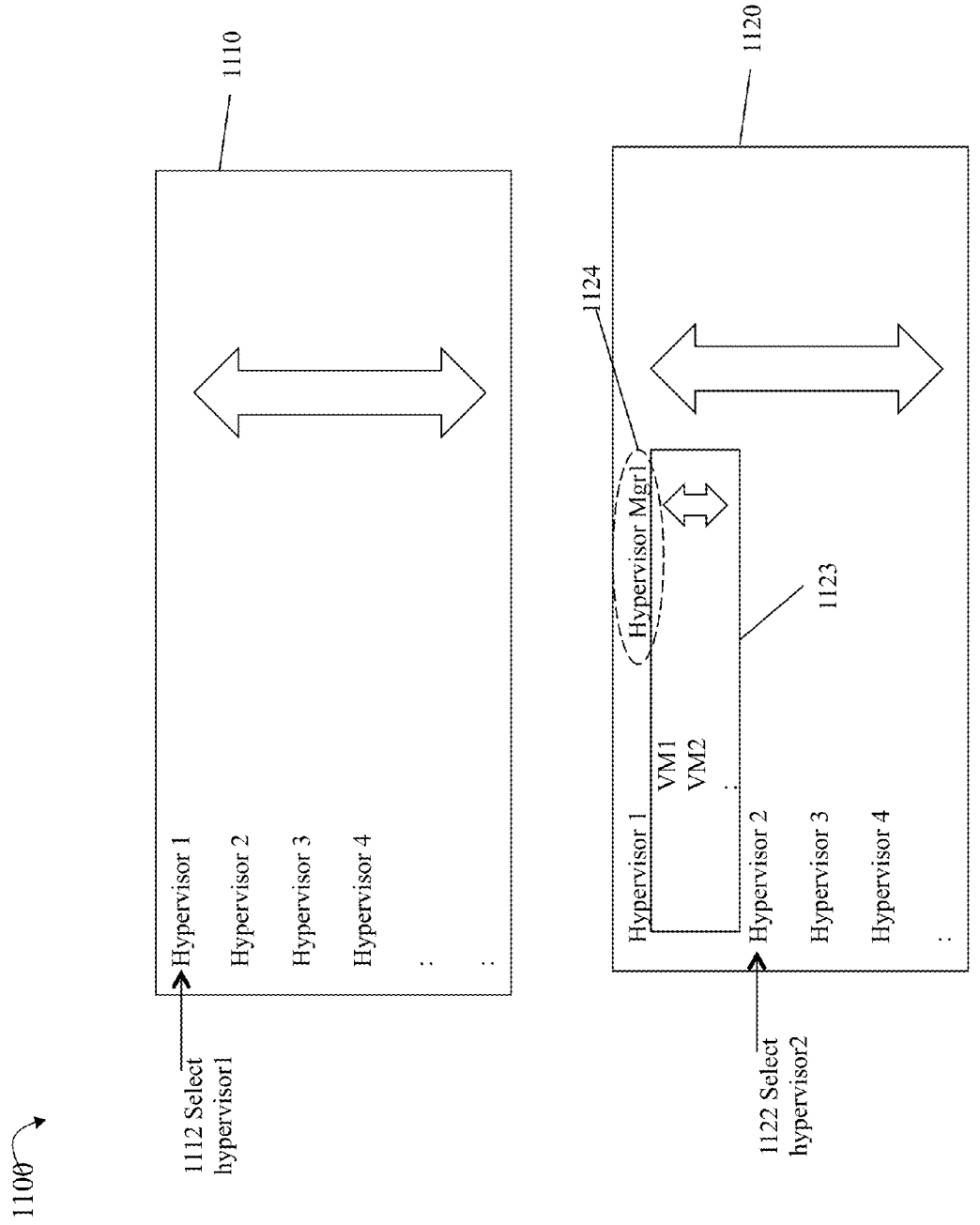
Figure 14:
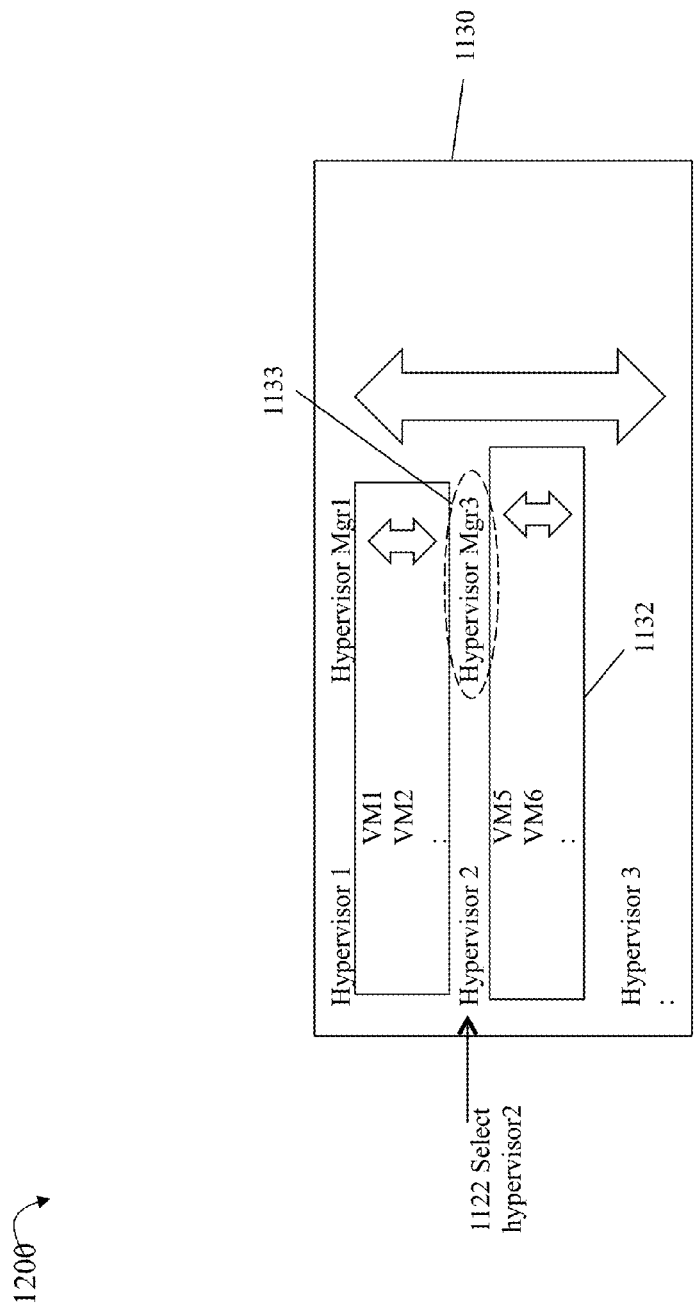

As another example of other criteria that a user may enter by which to initially sort and display information, reference is now made to FIGS. 13 and 14. At a first point in time, a user may specify to sort and display a list of hypervisors across all hypervisor mgrs. in the system resulting in the display area having content as represented by 1110 of FIG. 13. Element 1110 denotes an infinite scrolling area for scrolling through the sorted list of hypervisors. At a second point in time, a user may select 1112 hypervisor 1 from the display area 1110. In response to selecting hypervisor 1 1112, the display area may be updated from 1110 to 1120. The updated display area 1120 now includes information denoting the hypervisor mgr1 1124 of the selected hypervisor1 and also display area 1123 providing an infinite scrolling area for scrolling through the list of VMs managed by selected hypervisor 1. Thus, criteria may be used to specify a starting point for displaying information at level 2 in the hierarchy. Subsequent user selections of particular displayed items corresponding to objects at level 2 in the hierarchy may result in further information of related objects at level 1 in the hierarchy (e.g., hypervisor mgr1 as denoted by 1124 representing the hypervisor mgr that manages the selected hypervisor 1) and related objects at level 3 in the hierarchy (e.g. VMs in 1123 managed by selected hypervisor 1).

At a third point in time, a user may select 1122 yet another hypervisor2 from the display area 1120 resulting in display area 1120 being updated to that as represented by 1130 of FIG. 14. In particular, area 1120 is updated to now include hypervisor mgr3 1133 and display area 1132 as an infinite scrolling area for scrolling through the list of VMs managed by selected hypervisor 2 1122. Thus, display 1120 may be updated to include additional details regarding objects related to selected hypervisor 2 1122 in a manner similar to that as described above responsive to selecting hypervisor1 1112

Figure 15:
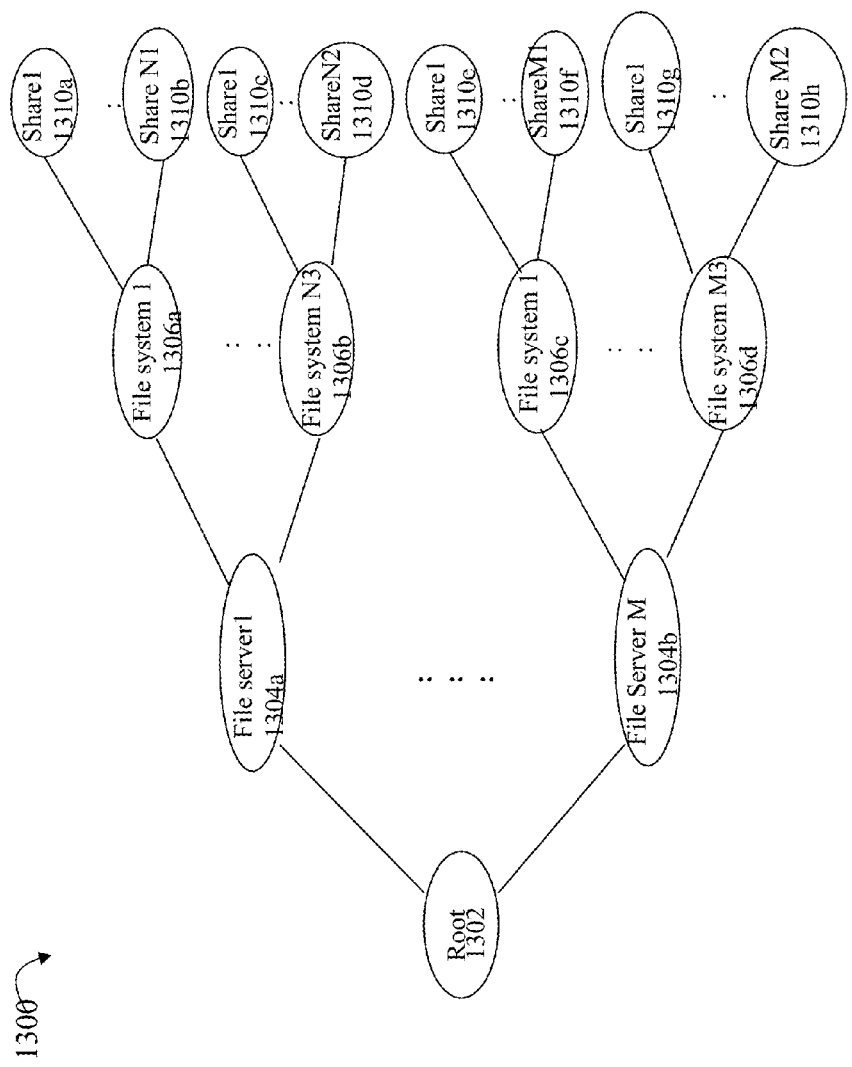

As mentioned elsewhere, techniques described herein are not limited to the particular hierarchy such as illustrated in FIGS. 1C and 10A. Rather any suitable objects of different types may be represented in a hierarchy for use with techniques herein For example, reference is made to FIG. 15 which illustrates another hierarchy of information that may be represented for use with techniques herein. The hierarchy 1300 may include one or more file servers 1304a-b represented by nodes at level 1, file systems 13-6a-d represented by nodes at level 2 and file shares 1310a-h as represented by nodes at level 3. As known in the art, a file share such as represented by each of nodes 1310a-h may include one or more folders, or more generally portions, of a file system that can be accessed by specified user, systems, and the like, if appropriate permission is granted. The techniques herein may be used in connection with displaying and sorting information having the hierarchical representation as in FIG. 15 in a manner similar to that as described herein with respect to the hierarchy of FIGS. 1C and 10A.

As described herein, criteria may be specified which indicates a level in the hierarchy at which objects are initially filtered or sorted for display. If such criteria specifies a level in the hierarchy other than at level 1, for example, the particular information displayed may vary. For example, if criteria indicates to initially sort and display objects at level 2 in the hierarchy (e.g., of FIG. 1C, 10A or 15), the particular information displayed may vary and may include information about related nodes at other levels in the hierarchy (e.g., such as described in connection with FIGS. 11, 12, 13 and 14).

In connection with techniques herein, multiple infinite scrolling areas may be provided in a GUI display where a user may interact independently with each such area. Each infinite scrolling area may provide for infinite scrolling of objects of a particular type represented at a particular level in the hierarchy.

When data which has been retrieved from the data storage system is no longer displayed due to user's current scrolling position, such data may be discarded. In one embodiment, data which is not currently displayed but has already been retrieved may be maintained as long as sufficient buffer space (e.g. memory) is available and as long as such data does not exceed a particular age. As the user continuously scrolls through the different levels of the information, it may be necessary to reclaim buffer space used to store undisplayed data in order to use such buffer space for new data to be displayed. In this manner, an embodiment may use different techniques to decide what buffer space to reclaim as such buffer space is needed to store data for the display. For example, an embodiment may reclaim buffer space first containing data which has an age that exceeds a maximum age. The maximum age may denote a maximum amount of time after which data is considered stale and no longer current or accurate for display. Data which is retrieved may be associated with a timestamp denoting time of retrieval. An age for data stored in the buffer may be calculated, for example, based on a difference between a current timestamp denoting a current time and the timestamp associated with the data (e.g. denoting when the data was first stored in the buffer space). An embodiment may also use a buffer space reclamation technique which reclaims buffer space first from undisplayed data that is farthest away from the current scrolling or cursor position. For example, buffered undisplayed data may be ranked or sorted based on distance from the current scrolling or cursor position whereby the data farthest away from the current cursor position is ranked highest. In this manner, buffer space may be reclaimed based on the foregoing ranked or sorted order with the highest ranked buffered undisplayed data (e.g., farthest from the current scrolling or cursor position) having its buffer space reclaimed prior to any lower ranked buffered undisplayed data (e.g., closer to the current scrolling or cursor position).

An embodiment may request and retrieve additional data for display in response to a UI event such as, for example, in response to the user scrolling up or down at a level in the displayed information, in response to the user selecting a displayed item for expansion (e.g. thereby requesting further detail or information regarding the selected item), in response to the user collapsing or retracting the detail of a displayed item, and the like.

An embodiment may use any suitable heuristic to decide an amount of data to request in response to a UI event. For example, one embodiment may request an amount of data depending on the amount of data that can be displayed on the screen at a particular level, the amount of buffer space, and the like. In one embodiment, when a new set of criteria is specified for sorting and displaying, such as described in connection with 920 of FIG. 10, any buffered data may be discarded and all buffer space reclaimed for storing new data retrieved in connection with the new set of criteria.

Figure 16:
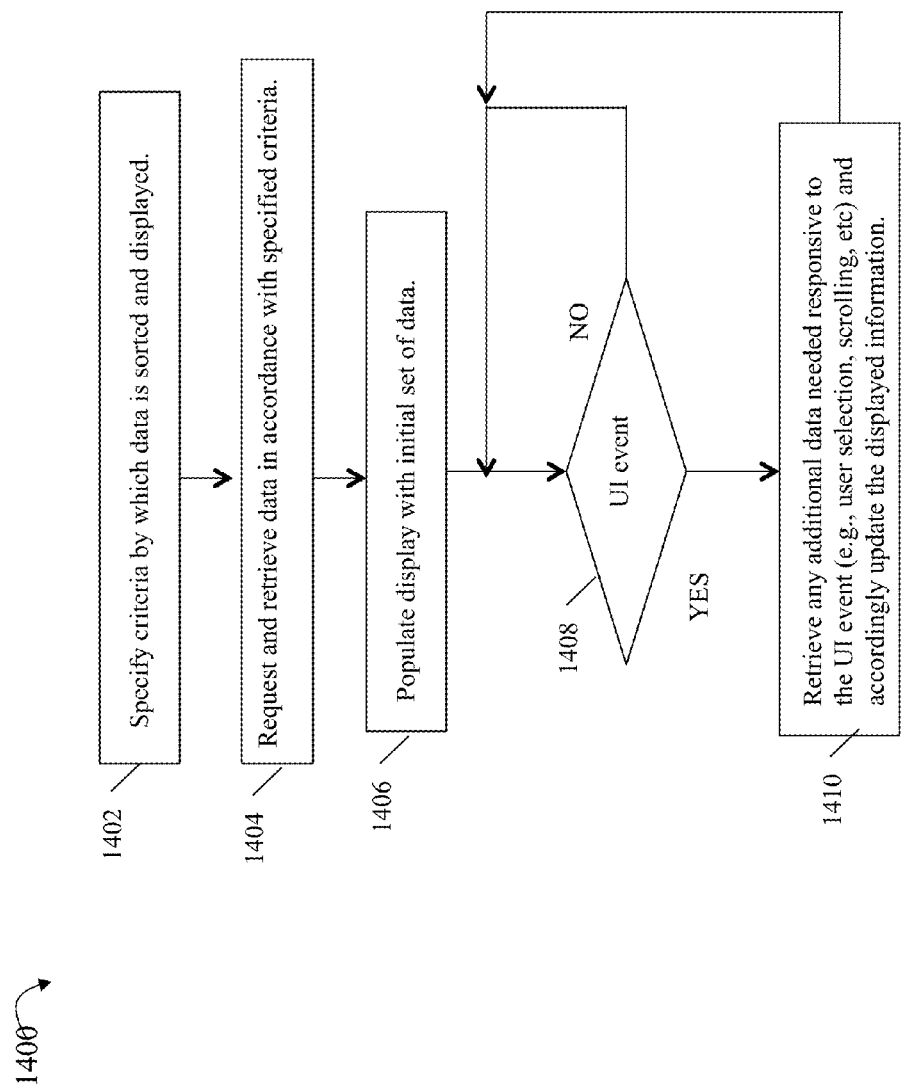
FIG. 16 is a flowchart of processing steps that may be performed in an embodiment in accordance with techniques described herein.

Referring to FIG. 16, shown is a flowchart of processing steps that may be performed in an embodiment in accordance with techniques herein. The flowchart 1400 generally summarized processing described above in connection with an overall processing flow for a GUI display of the client management software for a particular hierarchy. At step 1402, criteria is specified denoting how the sort and display the information. As described herein, such criteria may indicate a level of the hierarchy and sorting or filtering criteria denoting how to sort the objects at the indicated level of the hierarchy. An embodiment may specify a set of default criteria, such as when initially rendering a UI display or may otherwise allow a user to specify such criteria as described herein. At step 1404, the client management software may then request and retrieve information to be displayed, such as regarding objects of the hierarchy. At step 1406, the display may be initially populated. At step 1408, processing waits until the occurrence of a UI event. For example, as described herein, the UI event may be a selection of an item from a UI display, scrolling up or down in particular display areas, and the like. Upon the occurrence of a UI event, control proceeds to step 1410 to retrieve from the data storage system any additional data needed responsive to the UI event. Additionally, in step 1410, the UI display may then be accordingly updated as needed. From step 1410, control proceeds to step 1408.

It should be noted that additional processing other than as illustrated in FIG. 16 may be performed in an embodiment such as in connection with buffer space or memory reclamation, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method of displaying data comprising:
receiving a first set of data including a first plurality of objects at a first level in a hierarchy;
displaying at least some of the first plurality of objects on a user interface display;
selecting from the user interface display a first object from the at least some of the first plurality of objects displayed on the user interface display;
responsive to selecting the first object, receiving a second set of data including a second plurality of objects at a second level in the hierarchy; and
displaying at least some of the second plurality of objects on the user interface display, wherein said user interface display provides for infinite scrolling of the first plurality of objects in a first portion of the user interface display and for infinite scrolling of the second plurality of objects in a second portion of the user interface display, wherein, responsive to scrolling through the first plurality of objects, additional data objects are received and displayed in the first portion of the user interface display using infinite scrolling, wherein, as the additional data objects are displayed, at least some of the first plurality of objects are no longer displayed, and wherein a first memory, that stores the at least some of the first plurality of objects no longer displayed, is reused for storing the additional data objects, and wherein the first memory includes a plurality of memory portions for storing a plurality of undisplayed objects of the first plurality of objects, and the method further comprises:
determining any of an age and a distance from a current cursor location in the first portion of the user interface display for each of the plurality of undisplayed objects stored in a corresponding one of the plurality of memory portions;

ranking said plurality of memory portions in accordance with criteria including any of the age and the distance of each of the plurality of undisplayed objects stored in a corresponding one of the plurality of memory portions; and reusing said plurality of memory portions in an order based on said ranking.

2. The method of claim 1, wherein said hierarchy includes a plurality of levels of objects, each object in the hierarchy corresponding to any of a physical or logical entity in a system represented using the hierarchy.

3. The method of claim 2, wherein each object in the second plurality of objects is a child object of the first object selected.

4. The method of claim 2, wherein the second plurality of objects includes a parent object of the first object selected.

5. The method of claim 2, wherein said hierarchy is a hierarchy of relationships among entities in a virtual infrastructure.

6. The method of claim 5, wherein said hierarchy includes one or more objects at a first level each representing a hypervisor manager, one or more objects at a second level each representing a hypervisor managed by a hypervisor manager represented by an object at said first level, one or more objects at a third level each representing a virtual machine managed by a hypervisor represented by an object at said second level, and one or more objects at a fourth level each representing a logical device having storage provisioned for use by a virtual machine.

7. The method of claim 6, wherein each of the virtual machines represented by an object at the third level stores data on provisioned storage of a logical device representing by an object at the fourth level.

8. The method of claim 1, wherein said first plurality of objects are of a first type and said second plurality of objects are of a second type different from the first type, wherein each of said first type and said second type represent a different type of physical or logical entity represented using the hierarchy.

9. The method of claim 8, wherein said infinite scrolling in the first portion of the user interface display results in displaying additional objects of the first type in the first portion when scrolling downward in the first portion, and wherein said infinite scrolling in the second portion of the user interface display results in displaying additional objects of the second type in the second portion when scrolling downward in the second portion, and wherein scrolling in the first portion is performed independently of scrolling in the second portion.

10. The method of claim 1, wherein the second portion of the user interface display is included within the first portion of the user interface display.

11. The method of claim 1, wherein the first plurality of objects is determined in accordance with criteria used to initially sort and display information presented in the user interface display, wherein said criteria identifies a level in the hierarchy at which objects are sorted in connection with rendering information in the user interface display in said displaying at least some of the first plurality of objects.

12. The method of claim 1, wherein the criteria includes the age of each of the plurality of undisplayed objects and also includes the distance of each of the plurality of undisplayed objects from the current scrolling position, and wherein one of the plurality of memory portions storing one of the plurality of undisplayed objects having an associated age that exceeds a maximum age is selected for reuse prior to another of the plurality of memory portions storing another of the plurality of undisplayed objects having an associated age that does not exceed the maximum age, and wherein a first of the plurality of memory portions storing a first of the plurality of undisplayed objects that is a first distance from the current scrolling position is selected for reuse prior to a second of the plurality of memory portions storing a second of the plurality of undisplayed objects that is a second distance from the current scrolling position, said first distance being greater than the second distance.

13. A system comprising:

a plurality of virtual machines;

a plurality of hypervisors each executing on a host, wherein each of the plurality of hypervisors manages a portion of the plurality of virtual machines;

a plurality of hypervisor managers each executing on a host and each managing a portion of the plurality of hypervisors in connection with data storage management;

a data storage system including a plurality of storage devices, wherein each of the plurality of virtual machines stores data on storage provisioned on at least one of the plurality of storage devices;

a memory including code stored therein which, when executed by a processor, performs processing comprising:

receiving a first set of data including a first plurality of objects of a hierarchy representing the plurality of hypervisor managers;

displaying at least some of the first plurality of objects on a user interface display;

selecting from the user interface display a first object from the at least some of the first plurality of objects displayed on the user interface display, said first object representing a first of the plurality of hypervisor managers;

responsive to selecting the first object, receiving a second set of data including a second plurality of objects of the hierarchy representing a portion of the plurality of hypervisors managed by the first hypervisor manager; and displaying at least some of the second plurality of objects on the user interface display, wherein said user interface display provides for infinite scrolling of the first set plurality of objects representing the plurality of hypervisor managers in a first portion of the user interface display and for infinite scrolling of the second plurality of objects representing the portion of the plurality of hypervisors managed by the first hypervisor manager in a second portion of the user interface display, wherein a plurality of undisplayed objects are stored in a plurality of memory portions, said plurality of memory portions being selected for reuse based on an ordering determined in accordance with criteria including any of an age and a distance from a current scrolling position for each of the plurality of undisplayed objects.

14. The system of claim 13, wherein the hierarchy includes a plurality of levels, and wherein a first of the plurality of levels includes one or more objects each representing a hypervisor manager, a second of the plurality of levels includes one or more objects whereby each object of the second level represents a hypervisor managed by a hypervisor manager represented by an object at said first level, a third of the plurality of levels includes one or more objects whereby each objects of the third level represents a virtual machine managed by a hypervisor represented by an object at said second level, and a fourth of the plurality of levels includes one or more objects whereby each object of the fourth level represents a logical device having storage provisioned for use by a virtual machine represented by an object of the third level.

15. A non-transitory computer readable medium comprising code stored thereon that, when executed, performs a method of displaying data comprising:
   receiving a first set of data including a first plurality of objects at a first level in a hierarchy;
   displaying at least some of the first plurality of objects on a user interface display;
   selecting from the user interface display a first object from the at least some of the first plurality of objects displayed on the user interface display;
   responsive to selecting the first object, receiving a second set of data including a second plurality of objects at a second level in the hierarchy; and
   displaying at least some of the second plurality of objects on the user interface display, wherein said user interface display provides for infinite scrolling of the first plurality of objects in a first portion of the user interface display and for infinite scrolling of the second plurality of objects in a second portion of the user interface display, wherein, responsive to scrolling through the first plurality of objects, additional data objects are received and displayed in the first portion of the user interface display using infinite scrolling, wherein, as the additional data objects are displayed, at least some of the first plurality of objects are no longer displayed, and wherein a first memory, that stores the at least some of the first plurality of objects no longer displayed, is reused for storing the additional data objects, and wherein the first memory includes a plurality of memory portions for storing a plurality of undisplayed objects of the first plurality of objects, and the method further comprises:
   determining any of an age and a distance from a current cursor location in the first portion of the user interface display for each of the plurality of undisplayed objects stored in a corresponding one of the plurality of memory portions;
   ranking said plurality of memory portions in accordance with criteria including any of the age and the distance of each of the plurality of undisplayed objects stored in a corresponding one of the plurality of memory portions; and
   reusing said plurality of memory portions in an order based on said ranking.

16. The non-transitory computer readable medium of claim 15, wherein said hierarchy includes a plurality of levels of objects, each object in the hierarchy corresponding to any of a physical or logical entity in a system represented using the hierarchy.

17. The non-transitory computer readable medium of claim 16, wherein each object in the second plurality of objects is a child object of the first object selected.

* * * * *